US012804579B2

(12) United States Patent
Vassilovski et al.

(10) Patent No.: US 12,804,579 B2
(45) Date of Patent: Nov. 17, 2026

(54) ABSOLUTE TIME CORRECTION FOR SIDELINK COMMUNICATION

(71) Applicant: QUALCOMM Incorporated, San Diego, CA (US)

(72) Inventors: Dan Vassilovski, Del Mar, CA (US); Gabi Sarkis, San Diego, CA (US); Karthika Paladugu, Hyderabad (IN); Fatih Ulupinar, San Diego, CA (US); Ozcan Ozturk, San Diego, CA (US); Peng Cheng, Beijing (CN); Hong Cheng, Basking Ridge, NJ (US); Qing Li, Princeton Junction, NJ (US); Tien Viet Nguyen, Bridgewater, NJ (US); Gene Wesley Marsh, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 18/730,514

(22) PCT Filed: Mar. 28, 2022

(86) PCT No.: PCT/CN2022/083313

§ 371 (c)(1),
(2) Date: Jul. 19, 2024

(87) PCT Pub. No.: WO2023/184074

PCT Pub. Date: Oct. 5, 2023

(65) Prior Publication Data

US 2025/0106799 A1 Mar. 27, 2025

(51) Int. Cl.
*H04W 56/00* (2009.01)
*H04W 92/18* (2009.01)

(52) U.S. Cl.
CPC .................. *H04W 56/0065* (2013.01); *H04W 56/0015* (2013.01); *H04W 92/18* (2013.01)

(58) Field of Classification Search
CPC ......... H04W 56/0065; H04W 56/0015; H04W 92/218

(Continued)

(56) References Cited

U.S. PATENT DOCUMENTS

2020/0396734 A1 12/2020 Li et al.
2021/0321344 A1* 10/2021 Ryu ...................... H04W 76/14

FOREIGN PATENT DOCUMENTS

WO WO-2018059700 A1 * 4/2018 .......... H04W 72/542
WO WO-2022025868 A1 2/2022

OTHER PUBLICATIONS

Ericsson: "Propagation Delay Compensation Enhancements for Time Synchronization", 3GPP TSG-RAN WG1#107-e, Tdoc R1-2111191, e-Meeting, Nov. 11-19, 2021, pp. 1-15.

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a first sidelink device may obtain an absolute time. The first sidelink device may perform a ranging session on a first sidelink connection with a second sidelink device to obtain a first propagation delay between the first sidelink device and the second sidelink device. The first device may generate a first corrected absolute time for the second sidelink device based at least in part on the absolute time and the first propagation delay such that the second sidelink device will also have the absolute time. The first sidelink device may transmit the first (Continued)

600

602 corrected absolute time to the second sidelink device in a first message on the first sidelink connection. Numerous other aspects are described.

30 Claims, 18 Drawing Sheets

(58) Field of Classification Search
USPC .......................................................... 370/350
See application file for complete search history.

(56) References Cited

OTHER PUBLICATIONS

International Search Report and Written Opinion—PCT/CN2022/083313—ISA/EPO—Nov. 16, 2022.

* cited by examiner

ABSOLUTE TIME CORRECTION FOR SIDELINK COMMUNICATION

CROSS-REFERENCE TO RELATED APPLICATION

This Patent Application is a 371 national stage of PCT Application No. PCT/CN2022/083313, filed on Mar. 28, 2022, entitled "ABSOLUTE TIME CORRECTION FOR SIDELINK COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for distributing a correct absolute time for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more detailed description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
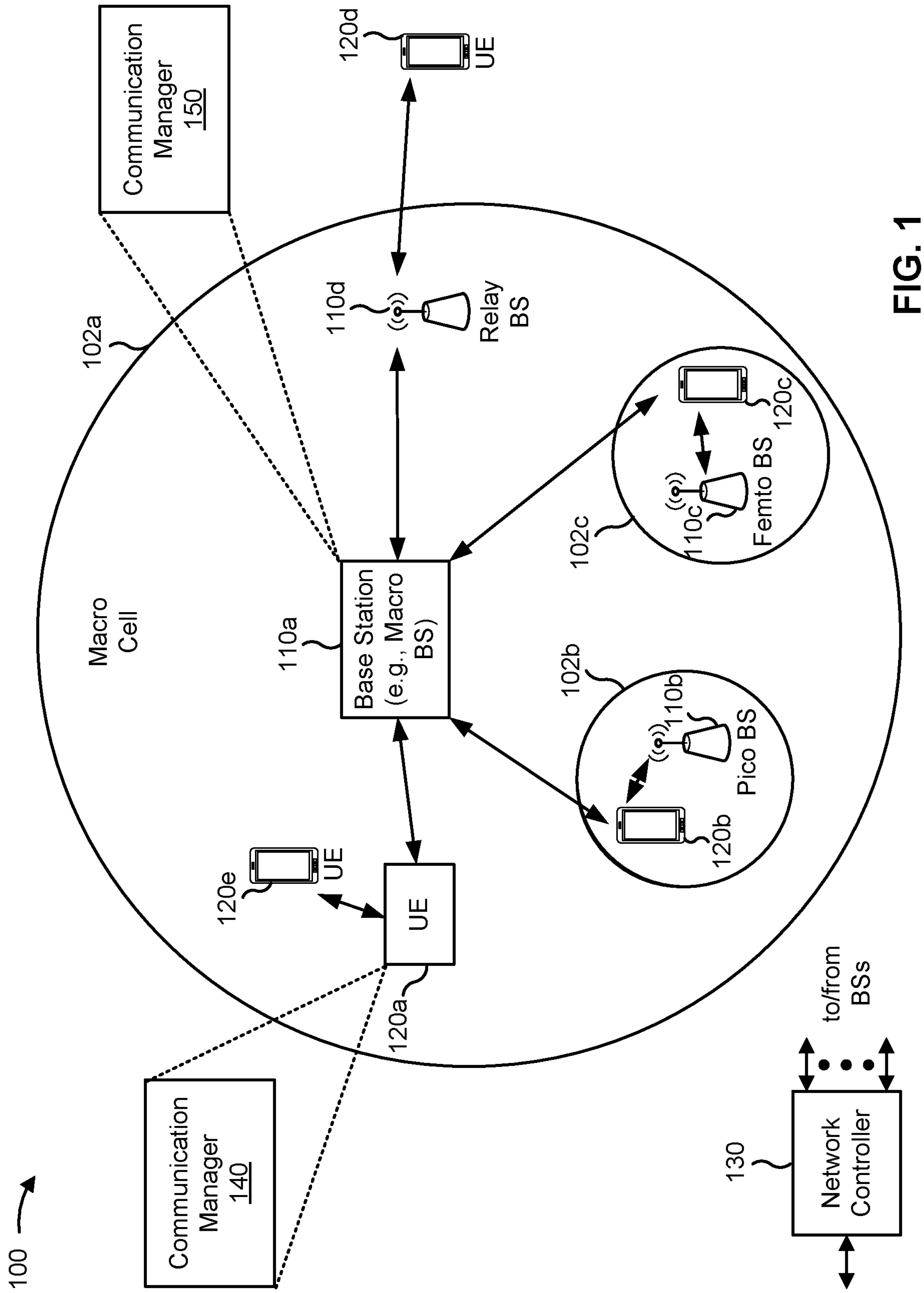
FIG. 1 is a diagram illustrating an example of a wireless network, in accordance with the present disclosure.

Some aspects described herein relate to a method of wireless communication performed by a first device. The method may include obtaining an absolute time. The method may include performing a ranging session on a first sidelink connection with a second device to obtain a first propagation delay between the first device and the second device. The method may include generating a first corrected absolute time for the second device based at least in part on the absolute time and the first propagation delay such that the second device will also have the absolute time. The method may include transmitting the first corrected absolute time to the second device in a first message on the first sidelink connection.

Some aspects described herein relate to a method of wireless communication performed by a second device. The method may include performing a ranging session on a sidelink connection with a first device. The method may include receiving a corrected absolute time for the second device in a message on the sidelink connection, where the corrected absolute time is associated with the ranging session and accounts for a propagation delay between the first device and the second device. The method may include setting an absolute time at the second device based at least in part on the corrected absolute time.

Some aspects described herein relate to a method of wireless communication performed by a first device. The method may include obtaining an absolute time. The method may include transmitting the absolute time as an uncorrected absolute time to a second device in a first message on a first sidelink connection.

Some aspects described herein relate to a method of wireless communication performed by a second device. The method may include receiving an uncorrected absolute time in a message. The method may include performing a ranging session on a sidelink connection with a first device to obtain a propagation delay between the first device and the second device. The method may include setting an absolute time for the second device based at least in part on the uncorrected absolute time and the propagation delay.

Some aspects described herein relate to a method of wireless communication performed by a network entity. The method may include generating a configuration that indicates whether a first device is to share an absolute time or a corrected absolute time with a second device over a sidelink connection, where the corrected absolute time accounts for a propagation delay between the first device and the second device over the sidelink connection. The method may include transmitting the configuration in a message to the first device.

Some aspects described herein relate to a first device for wireless communication. The first device may include a memory and one or more processors coupled to the memory. The one or more processors may be configured to obtain an absolute time. The one or more processors may be configured to perform a ranging session on a first sidelink connection with a second device to obtain a first propagation delay between the first device and the second device. The one or more processors may be configured to generate a first corrected absolute time for the second device based at least in part on the absolute time and the first propagation delay such that the second device will also have the absolute time. The one or more processors may be configured to transmit the first corrected absolute time to the second device in a first message on the first sidelink connection.

Some aspects described herein relate to a second device for wireless communication. The second device may include a memory and one or more processors coupled to the memory. The one or more processors may be configured to perform a ranging session on a sidelink connection with a first device. The one or more processors may be configured to receive a corrected absolute time for the second device in a message on the sidelink connection, where the corrected absolute time is associated with the ranging session and accounts for a propagation delay between the first device and the second device. The one or more processors may be configured to set an absolute time at the second device based at least in part on the corrected absolute time.

Some aspects described herein relate to a first device for wireless communication. The first device may include a memory and one or more processors coupled to the memory. The one or more processors may be configured to obtain an absolute time. The one or more processors may be configured to transmit the absolute time as an uncorrected absolute time to a second device in a first message on a first sidelink connection.

Some aspects described herein relate to a second device for wireless communication. The second device may include a memory and one or more processors coupled to the memory. The one or more processors may be configured to receive an uncorrected absolute time in a message. The one or more processors may be configured to perform a ranging session on a sidelink connection with a first device to obtain a propagation delay between the first device and the second device. The one or more processors may be configured to set an absolute time for the second device based at least in part on the uncorrected absolute time and the propagation delay.

Some aspects described herein relate to a network entity for wireless communication. The network entity may include a memory and one or more processors coupled to the memory. The one or more processors may be configured to generate a configuration that indicates whether a first device is to share an absolute time or a corrected absolute time with a second device over a sidelink connection, where the corrected absolute time accounts for a propagation delay between the first device and the second device over the sidelink connection. The one or more processors may be configured to transmit the configuration in a message to the first device.

Some aspects described herein relate to a non-transitory computer-readable medium that stores a set of instructions for wireless communication by a first device. The set of instructions, when executed by one or more processors of the first device, may cause the first device to obtain an absolute time. The set of instructions, when executed by one or more processors of the first device, may cause the first device to perform a ranging session on a first sidelink connection with a second device to obtain a first propagation delay between the first device and the second device. The set of instructions, when executed by one or more processors of the first device, may cause the first device to generate a first corrected absolute time for the second device based at least in part on the absolute time and the first propagation delay such that the second device will also have the absolute time. The set of instructions, when executed by one or more processors of the first device, may cause the first device to transmit the first corrected absolute time to the second device in a first message on the first sidelink connection.

Some aspects described herein relate to a non-transitory computer-readable medium that stores a set of instructions for wireless communication by a second device. The set of instructions, when executed by one or more processors of the second device, may cause the second device to perform a ranging session on a sidelink connection with a first device. The set of instructions, when executed by one or more processors of the second device, may cause the second device to receive a corrected absolute time for the second device in a message on the sidelink connection, where the corrected absolute time is associated with the ranging session and accounts for a propagation delay between the first device and the second device. The set of instructions, when executed by one or more processors of the second device, may cause the second device to set an absolute time at the second device based at least in part on the corrected absolute time.

Some aspects described herein relate to a non-transitory computer-readable medium that stores a set of instructions for wireless communication by a first device. The set of instructions, when executed by one or more processors of the first device, may cause the first device to obtain an absolute time. The set of instructions, when executed by one or more processors of the first device, may cause the first device to transmit the absolute time as an uncorrected absolute time to a second device in a first message on a first sidelink connection.

Some aspects described herein relate to a non-transitory computer-readable medium that stores a set of instructions for wireless communication by a second device. The set of instructions, when executed by one or more processors of the second device, may cause the second device to receive an uncorrected absolute time in a message. The set of instructions, when executed by one or more processors of the second device, may cause the second device to perform a ranging session on a sidelink connection with a first device to obtain a propagation delay between the first device and the second device. The set of instructions, when executed by one or more processors of the second device, may cause the second device to set an absolute time for the second device based at least in part on the uncorrected absolute time and the propagation delay.

Some aspects described herein relate to a non-transitory computer-readable medium that stores a set of instructions for wireless communication by a network entity. The set of instructions, when executed by one or more processors of the network entity, may cause the network entity to generate a configuration that indicates whether a first device is to share an absolute time or a corrected absolute time with a second device over a sidelink connection, where the corrected absolute time accounts for a propagation delay between the first device and the second device over the sidelink connection. The set of instructions, when executed by one or more processors of the network entity, may cause the network entity to transmit the configuration in a message to the first device.

Some aspects described herein relate to an apparatus for wireless communication. The apparatus may include means for obtaining an absolute time. The apparatus may include means for performing a ranging session on a first sidelink connection with another apparatus to obtain a first propagation delay between the apparatus and the other apparatus. The apparatus may include means for generating a first corrected absolute time for the other apparatus based at least in part on the absolute time and the first propagation delay such that the other apparatus will also have the absolute time. The apparatus may include means for transmitting the first corrected absolute time to the other apparatus in a first message on the first sidelink connection.

Some aspects described herein relate to an apparatus for wireless communication. The apparatus may include means for performing a ranging session on a sidelink connection with another apparatus. The apparatus may include means for receiving a corrected absolute time for the apparatus in a message on the sidelink connection, where the corrected absolute time is associated with the ranging session and accounts for a propagation delay between the apparatus and the other apparatus. The apparatus may include means for setting an absolute time at the apparatus based at least in part on the corrected absolute time.

Some aspects described herein relate to an apparatus for wireless communication. The apparatus may include means for obtaining an absolute time. The apparatus may include means for transmitting the absolute time as an uncorrected absolute time to another apparatus in a first message on a first sidelink connection.

Some aspects described herein relate to an apparatus for wireless communication. The apparatus may include means for receiving an uncorrected absolute time in a message. The apparatus may include means for performing a ranging session on a sidelink connection with another apparatus to obtain a propagation delay between the apparatus and the other apparatus. The apparatus may include means for setting an absolute time for the apparatus based at least in part on the uncorrected absolute time and the propagation delay.

Some aspects described herein relate to an apparatus for wireless communication. The apparatus may include means for generating a configuration that indicates whether a first device is to share an absolute time or a corrected absolute time with a second device over a sidelink connection, where the corrected absolute time accounts for a propagation delay between the first device and the second device over the sidelink connection. The apparatus may include means for transmitting the configuration in a message to the first device.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., a UE 120) may include a communication manager 140. As described in more detail elsewhere herein, the communication manager 140 may obtain an absolute time and perform a ranging session on a first sidelink connection with a second device to obtain a first propagation delay between the first device and the second device. The communication manager 140 may generate a first corrected absolute time for the second device based at least in part on the absolute time and the first propagation delay such that the second device will also have the absolute time and transmit the first corrected absolute time to the second device in a first message on the first sidelink connection.

In some aspects, the communication manager 140 may obtain an absolute time and transmit the absolute time as an uncorrected absolute time to a second device in a first message on a first sidelink connection.

In some aspects, a second device (e.g., UE 120) may include a communication manager 140. As described in more detail elsewhere herein, the communication manager 140 may perform a ranging session on a sidelink connection with a first device and receive a corrected absolute time for the second device in a message on the sidelink connection, where the corrected absolute time is associated with the ranging session and accounts for a propagation delay between the first device and the second device. The communication manager 140 may set an absolute time at the second device based at least in part on the corrected absolute time.

In some aspects, the communication manager 140 may receive an uncorrected absolute time in a message and perform a ranging session on a sidelink connection with a first device to obtain a propagation delay between the first device and the second device. The communication manager 140 may set an absolute time for the second device based at least in part on the uncorrected absolute time and the propagation delay. Additionally, or alternatively, the communication manager 140 may perform one or more other operations described herein.

In some aspects, a network entity (e.g., a base station 110) may include a communication manager 150. As described in more detail elsewhere herein, the communication manager 150 may generate a configuration that indicates whether a first device is to share an absolute time or a corrected absolute time with a second device over a sidelink connection, where the corrected absolute time accounts for a propagation delay between the first device and the second device over the sidelink connection. The communication manager 150 may transmit the configuration in a message to the first device. Additionally, or alternatively, the communication manager 150 may perform one or more other operations described herein.

As indicated above, FIG. 1 is provided as an example. Other examples may differ from what is described with regard to FIG. 1.

Figure 2:
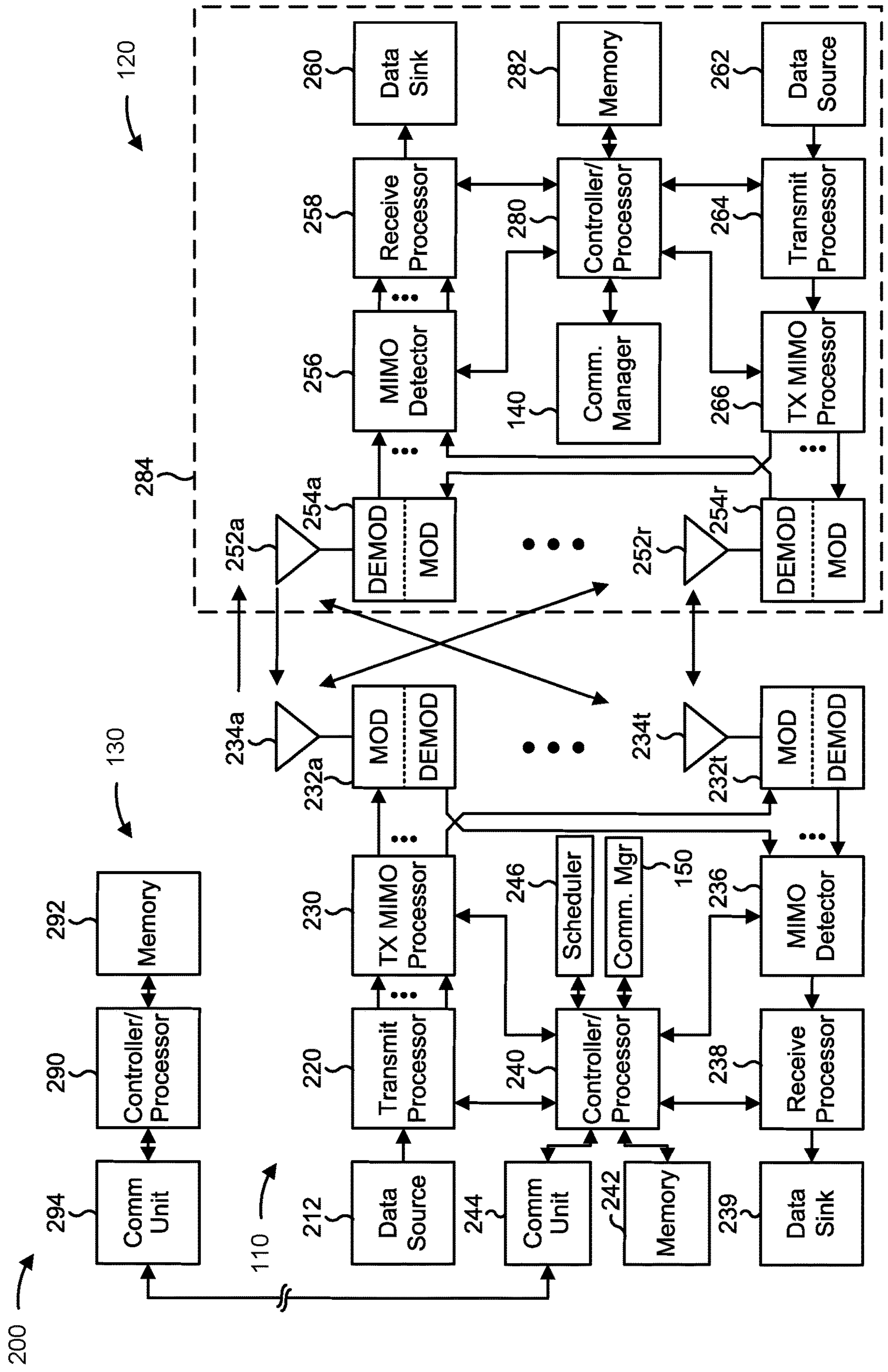
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-18).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-18).

A controller/processor of a network entity, (e.g., the controller/processor 240 of the base station 110), the controller/processor 280 of the UE 120, and/or any other component(s) of FIG. 2 may perform one or more techniques associated with distributing a correct absolute time over sidelink, as described in more detail elsewhere herein. In some aspects, the first device described herein is a sidelink UE (e.g., UE 120*a*), is included in a UE 120, or includes one or more components of the UE 120 shown in FIG. 2. In some aspects, the second device described herein is another sidelink (e.g., UE 120*e*), is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1100 of FIG. 11, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, a first device (e.g., UE 120) includes means for obtaining an absolute time; means for performing a ranging session on a first sidelink connection with a second device to obtain a first propagation delay between the first device and the second device; means for generating a first corrected absolute time for the second device based at least in part on the absolute time and the first propagation delay such that the second device will also have the absolute time; and/or means for transmitting the first corrected absolute time to the second device in a first message on the first sidelink connection. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory In some aspects, a second device (e.g., a UE 120) includes means for performing a ranging session on a sidelink connection with a first device; means for receiving a corrected absolute time for the second device in a message on the sidelink connection, where the corrected absolute time is associated with the ranging session and accounts for a propagation delay between the first device and the second device; and/or means for setting an absolute time at the second device based at least in part on the corrected absolute time. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first device includes means for obtaining an absolute time; and/or means for transmitting the absolute time as an uncorrected absolute time to a second device in a first message on a first sidelink connection.

In some aspects, the second device includes means for receiving an uncorrected absolute time in a message; means for performing a ranging session on a sidelink connection with a first device to obtain a propagation delay between the first device and the second device; and/or means for setting an absolute time for the second device based at least in part on the uncorrected absolute time and the propagation delay.

In some aspects, a network entity (e.g., a base station 110) includes means for generating a configuration that indicates whether a first device is to share an absolute time or a corrected absolute time with a second device over a sidelink connection, where the corrected absolute time accounts for a propagation delay between the first device and the second device over the sidelink connection; and/or means for transmitting the configuration in a message to the first device. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
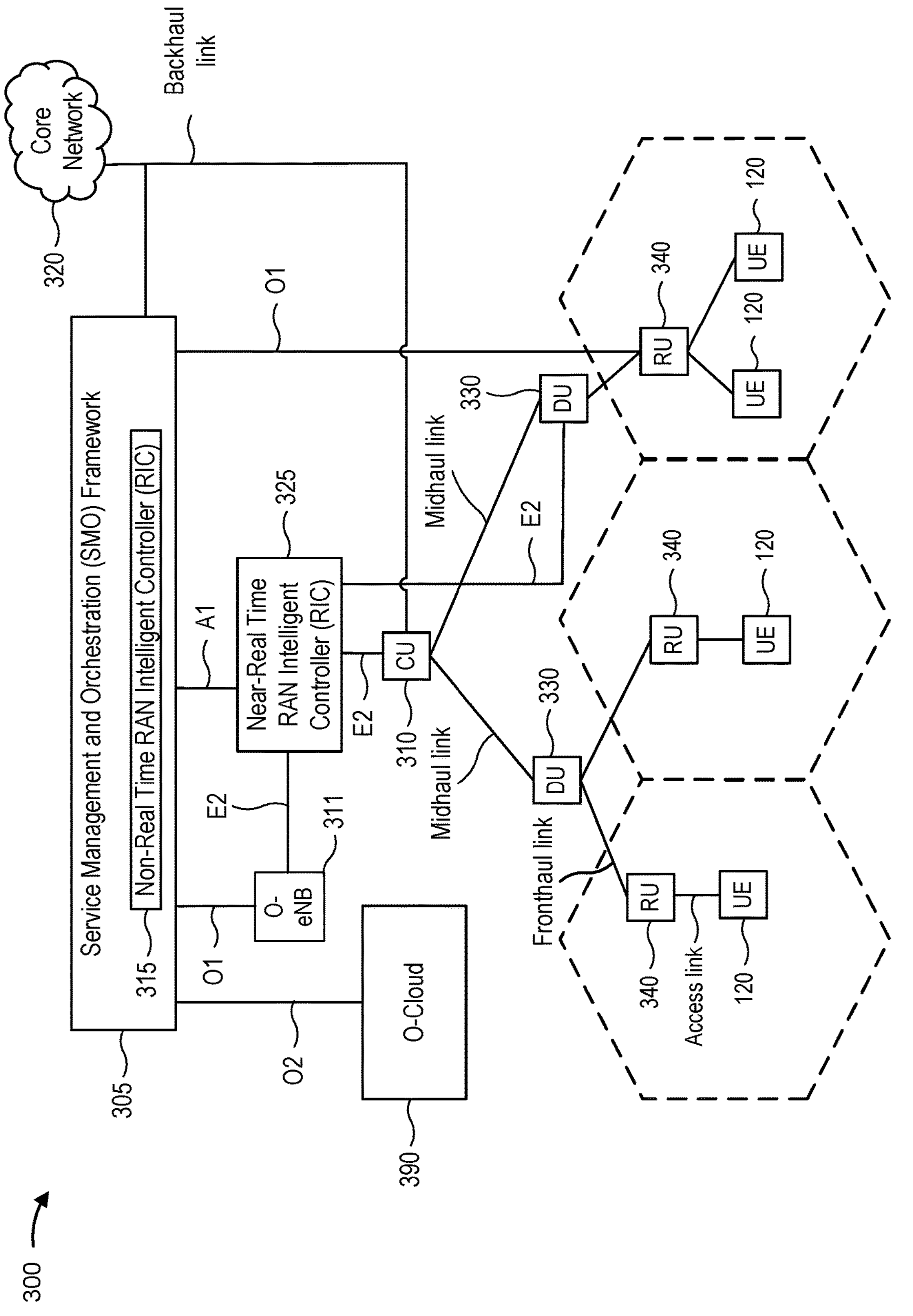
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs") and "O-RAN RUs (O-RUS)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
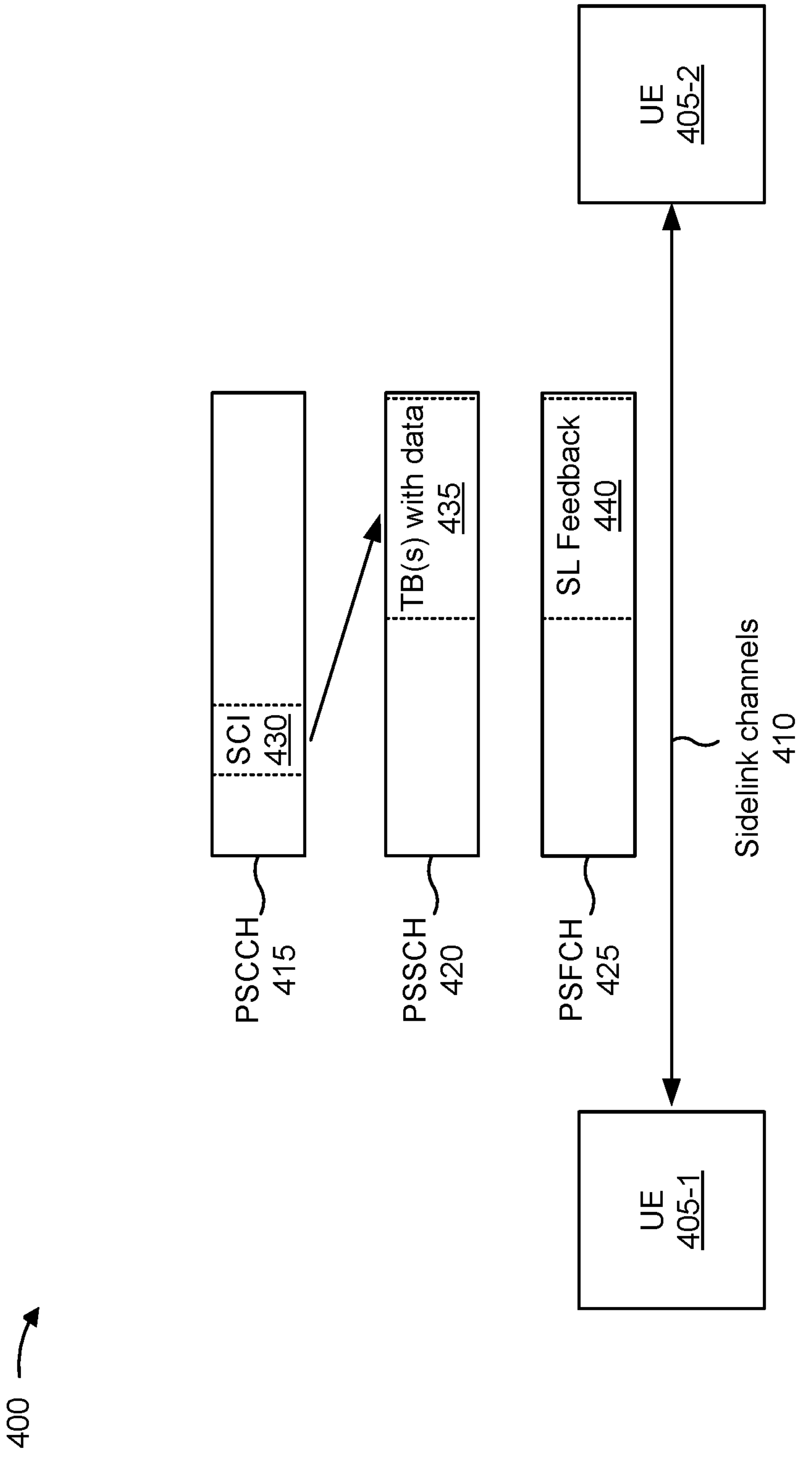
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or an MCS. The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network entity (e.g., base station 110). For example, the UE 405 may receive a grant (e.g., in downlink control information (DCI) or in an RRC message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
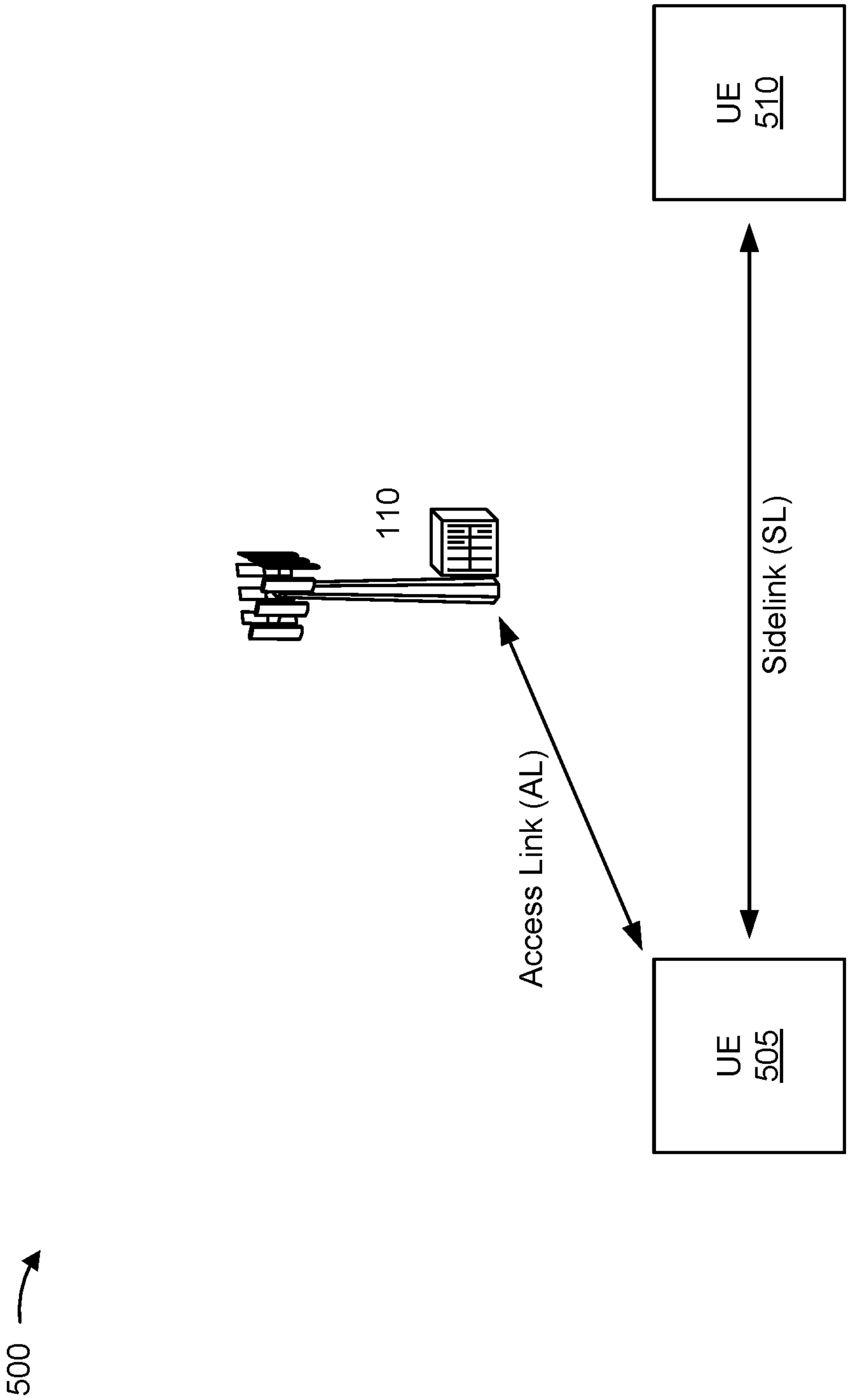
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, UE 505 and UE 510 may communicate with one another via a sidelink connection, as described above in connection with FIG. 4. As further shown, in some sidelink modes, a network entity (e.g., a base station 110) may communicate with UE 505 via a first access link. Additionally, or alternatively, in some sidelink modes, the network entity may communicate with UE 510 via a second access link. UE 505 and/or UE 510 may correspond to one or more UEs described elsewhere herein, such as the UE 120 of FIG. 1. Thus, a direct link between UEs 120 (e.g., via a PC5 interface) may be referred to as a sidelink or a sidelink connection, and a direct link between a base station 110 and a UE 120 (e.g., via a Uu interface) may be referred to as an access link or an access link connection. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Accurate time knowledge is important for many aspects of UE sidelink operation, including for sidelink ranging and positioning. Sidelink ranging and positioning may be used for various applications, such as for industrial IoT applications and for automated or coordinated vehicle driving applications. Some applications may be required to have a target ranging accuracy of 0.1 meters (m) and thus an accurate time (e.g., absolute time) may be required.

LTE and NR provide mechanisms for a network to provide an absolute time to a UE over a Uu connection. Absolute time, as described herein for the present disclosure, refers to a current clock time consistent with a global clock time and not to a concept in Newtonian or relativistic physics. However, some UEs, such as UE 510, may operate in sidelink communication out of coverage from the network. Any absolute time distribution over a sidelink connection may be subject to propagation delay errors. For example, a separation between a time source UE (e.g., UE 505) and a receiver UE (e.g., UE 510) may be 300 m, which may lead to a 1 microsecond error. If UE 505 were to provide an absolute time to UE 510, the absolute time at UE 510 would be incorrect. There is no procedure for distributing an accurate absolute time over sidelink connections.

As indicated above, FIG. 5 is provided as an example. Other examples may differ from what is described with respect to FIG. 5.

Figure 6:
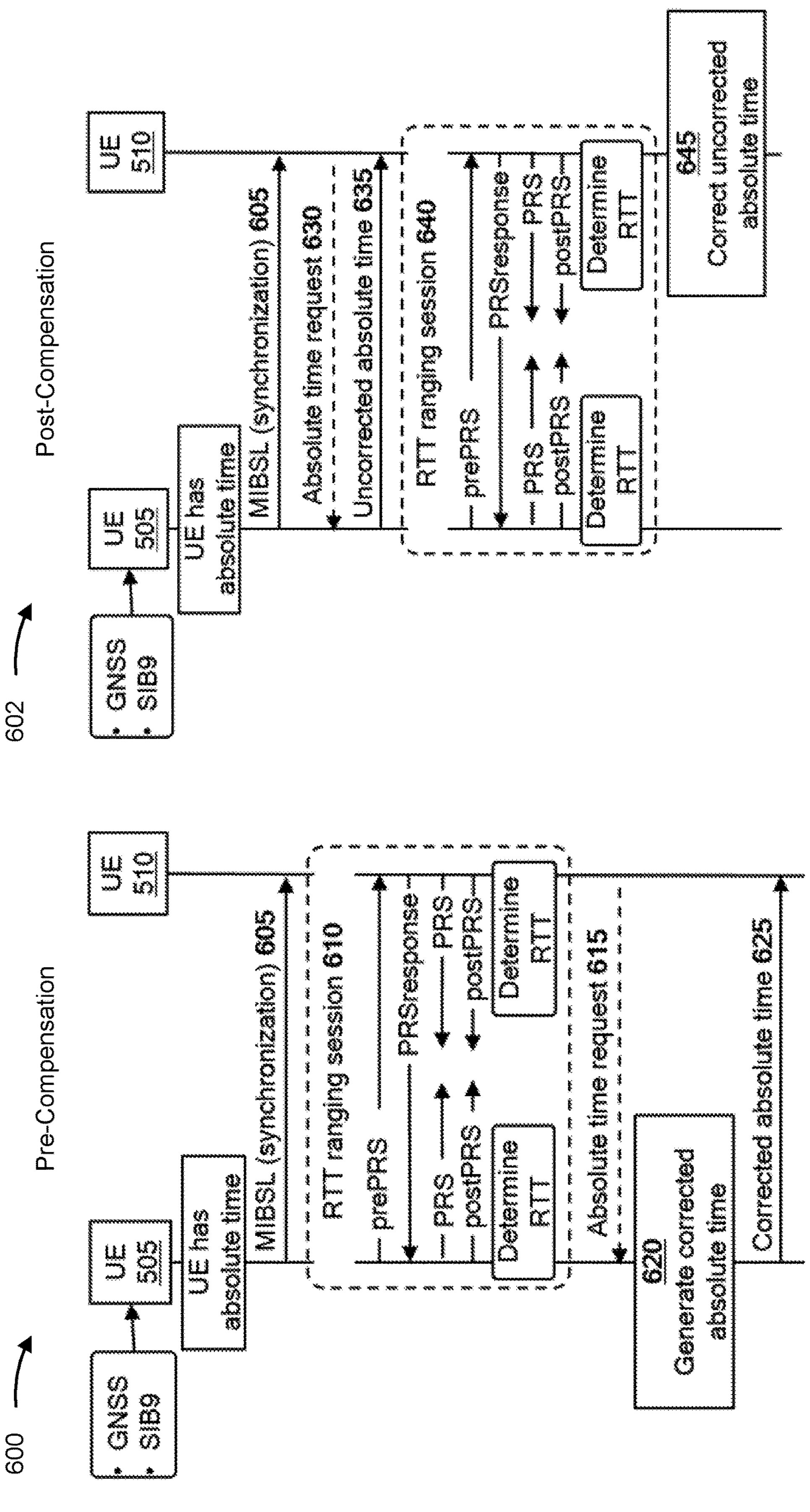
FIG. 6 is a diagram illustrating examples of propagation delay compensation for absolute time distribution for sidelink communication, in accordance with the present disclosure.

FIG. 6 is a diagram illustrating examples 600 and 602 of propagation delay compensation for absolute time distribution for sidelink communication, in accordance with the present disclosure.

According to various aspects described herein, sidelink devices may implement sidelink propagation delay compensation (PDC) such that both sidelink devices have the same correct absolute time. PDC may involve performing a ranging session over a sidelink connection to obtain a propagation delay between the sidelink devices and using the propagation delay to correct a transmitted or received absolute time.

Correction by the transmitting sidelink UE may be referred to as "pre-compensation" or a proactive "pre-correction." Example 600 shows an example of pre-compensation. As shown by reference number 605, a first device (e.g., UE 505) may transmit a master information block (MIB) for sidelink (MIBSL), which can be used to synchronize UE 505 and a second device (e.g., UE 510). As shown by reference number 610, UE 505 may perform a ranging session, which may be a sidelink round-trip time (RTT) session. The ranging session may be a positioning session or part of a positioning session. The ranging session may be performed solely for RTT measurements for PDC. The sidelink RTT session may include UE 505 transmitting a signal, such as a positioning reference signal (PRS), at a transmit time. The PRS may be set up with, for example, a prePRS message and a PRS response message. UE 505 may receive, in a postPRS message for example, an indication of a receive time for the signal. UE 505 may obtain the first propagation delay based at least in part on a time difference between the transmit time and the receive time. UE 505 may also receive a PRS with an indication of a transmit time for the PRS and measure a receive time for the PRS. UE 505 may obtain the propagation delay based at least in part on a time difference between the transmit time and the receive time.

UE 505 may initiate the distribution of the absolute time, or a corrected absolute time. Alternatively, in some aspects, UE 510 may initiate distribution of the absolute time, or the corrected absolute time. As shown by reference number 615, UE 505 may receive a request for the absolute time and generate the corrected absolute time in response to the request.

As shown by reference number 620, UE 505 may subtract the propagation delay from the absolute time (obtained from the network) to generate the corrected absolute time. As shown by reference number 625, UE 505 may transmit the corrected absolute time in a message to UE 510 such that UE 510 will have the same absolute time as UE 505. The message may be a unicast message to UE 510 or a broadcast/groupcast message to multiple UEs at the same distance. The message may be a PC5 signaling (PC5-S) message, a PC5 RRC message, or a PC5 medium access control control element (MAC CE). The message may include an information element (IE) (e.g., SL-Reference TimeInfo) with multiple fields. The message may include a reference distributed frame number (DFN) in an sl-referenceDFN field. If the UEs are synchronized, at least with respect to DFNs, the DEN may serve as a reference for the reference time information (e.g., absolute time and/or the propagation delay). Other frame numbers or reference points may be used.

The IE may include a time field for the absolute time with, for example, a granularity of 10 nanoseconds (ns). Other granularities may be used. The absolute time in this field may be referenced at the network without compensating for a propagation delay or may be the corrected absolute time that compensates for the propagation delay. The indicated time in 10 ns units from the origin may be refDays×86400×1000×100000+refSeconds×1000×100000+refMilliSeconds×100000+refTenNanoSeconds. The refDays field may specify the sequential number of days (with the day count starting at 0) from the origin of the time field.

If the corrected absolute time is received in a reference time PDC field (e.g., sl-reference TimePDC), the time field may indicate the time at the DFN boundary at or immediately after the ending boundary of the system information window in which sl-reference Time-PDC is transmitted. The sl-reference Time-PDC field may be excluded when determining changes in system information. That is, time changes may neither result in system information change notifications nor in a modification of a field value Tag in SIB1.

The IE may have other fields. For example, the IE may include an uncertainty field that indicates the uncertainty of the reference time information provided by the time field. The uncertainty may be 25 ns multiplied by this field. If this field is absent, the uncertainty may be unspecified. The IE may include a time information type field (e.g., timeInfoType) that indicates the global positioning system (GPS) time, and the origin of the time field is 00:00:00 on Gregorian calendar date 6 Jan. 1980 (start of GPS time). If timeInfoType is set to localClock, the origin of the time may be unspecified.

The IE may include a PDC field (e.g., sl-PropDelayComp) that indicates the one-way time propagation delay measured in, for example, units of 0.33 ns. The IE may also include a PDC uncertainty field (e.g., sl-UncertaintyPDC) that indicates the uncertainty of the propagation delay compensation time information provided by the sl-PropDelayComp field. The uncertainty may be, for example, 0.3 ns multiplied by this field. The uncertainty granularity or resolution may be adjusted. If this field is absent, the uncertainty is unspecified. The PDC field and the PDC uncertainty field may be more applicable when post-compensation (described below) is used.

Alternatively, correction by the receiving UE may be referred to as "post-compensation" or reactive "post-correction." Example 602 shows an example of post-compensation. UE 505 may initiate the distribution of the absolute time, or an uncorrected absolute time. Alternatively, in some aspects, UE 510 may initiate distribution of the uncorrected absolute time. As shown by reference number 630, UE 505 may receive a request for the absolute time and generate the uncorrected absolute time in response to the request.

In some aspects, UE 505 may initiate distribution of the uncorrected absolute time. Alternatively, in some aspects, as shown by reference number 630, UE 505 may receive a request for the absolute time.

As shown by reference number 635, UE 505 may transmit the absolute time as an uncorrected absolute time, in a unicast message or a broadcast/group message. The uncorrected absolute time will be subject to the propagation delay. As described for example 600, UE 510 may receive an indication of the propagation delay.

Alternatively, UE 510 may perform PDC, which includes performing a ranging session to obtain the propagation delay, as shown by reference number 640. For example, UE 510 may obtain the propagation delay via the RTT ranging session and correct the uncorrected absolute time received from UE 505, as shown by reference number 645. UE 510 may subtract the propagation delay from the uncorrected absolute time to obtain the same correct absolute time as UE 510. Whether the PDC is pre-compensation or post-compensation can be controlled by the initiating UE of the ranging session.

PDC may be applicable for different scenarios. UE 505 and/or UE 510 may perform PDC in a partial coverage scenario, where UE 505 is in network coverage but other UEs are not. UE1 may keep absolute time, having obtained the absolute time from the network (e.g., gNB) via a system information block (SIB), such as a SIB9. UE 505 and/or UE 510 may also perform PDC in an out of coverage scenario. For example, UE 505 and UE 510 are not in network coverage but UE 505 may receive the absolute time from a satellite that is part of a global navigation satellite system (GNSS).

By distributing the absolute time such that it is correct among the sidelink UEs, UE 505 may increase the success and accuracy of communications between the sidelink UEs. This may conserve processing resources and signaling resources with less degraded communications. This may also increase the safety of V2X applications.

As indicated above, FIG. 6 is provided as an example. Other examples may differ from what is described with regard to FIG. 6.

Figure 7:
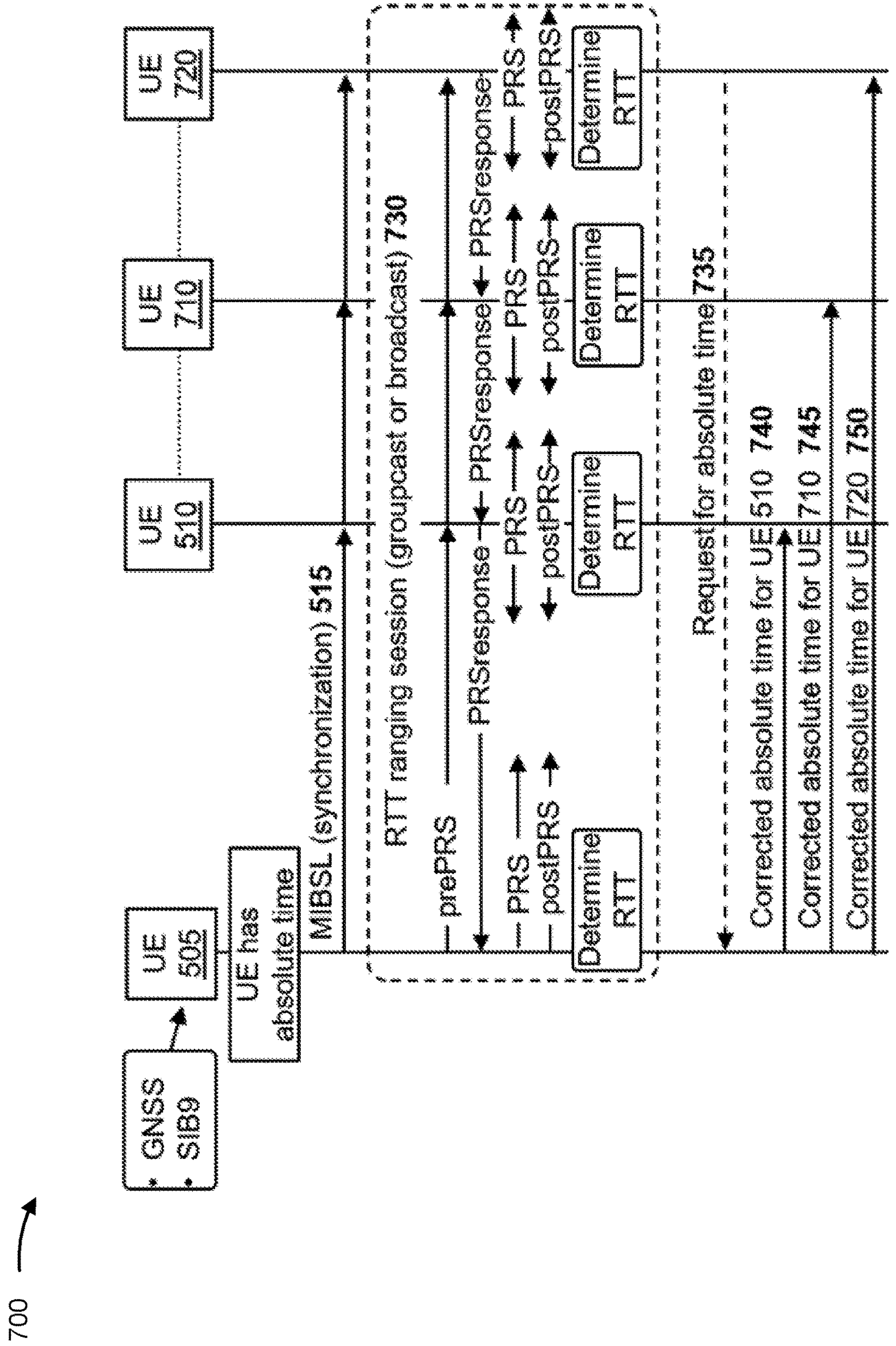
FIG. 7 is a diagram illustrating an example of absolute time distribution to multiple sidelink UEs, in accordance with the present disclosure.

FIG. 7 is a diagram illustrating an example 700 of absolute time distribution to multiple sidelink UEs, in accordance with the present disclosure. Example 700 shows UE 505 and UE 510 but with additional UEs, such as UE 710 and UE 720.

In some aspects, UE 505 may transmit a corrected absolute time to multiple UEs. In this case, as shown by reference number 730, UE 505 may perform a ranging session that unicasts, broadcasts, or groupcasts signals for determining RTTs. Each UE may transmit a PRS that is measured and may transmit a transmit time or receive time to UE 505 or other UEs. Some UEs may provide propagation delay information based at least in part on neighboring UEs.

UE 505 may initiate the distribution of the absolute time, or a corrected absolute time. Alternatively, in some aspects, UE 510 may initiate distribution of the absolute time, or the corrected absolute time. As shown by reference number 735, UE 505 may receive a request for the absolute time (from any of the UEs) and generate the corrected absolute time in response to the request.

UE 505 may generate corrected absolute times for the UEs based at least in part on the respective propagation delays for the UEs. As shown by reference number 740, UE 505 may transmit the corrected absolute time for UE 510. As shown by reference number 745, UE 505 may transmit the corrected absolute time for UE 710. As shown by reference number 750, UE 505 may transmit the corrected absolute time for UE 720.

As indicated above, FIG. 7 is provided as an example. Other examples may differ from what is described with regard to FIG. 7.

Figure 8:
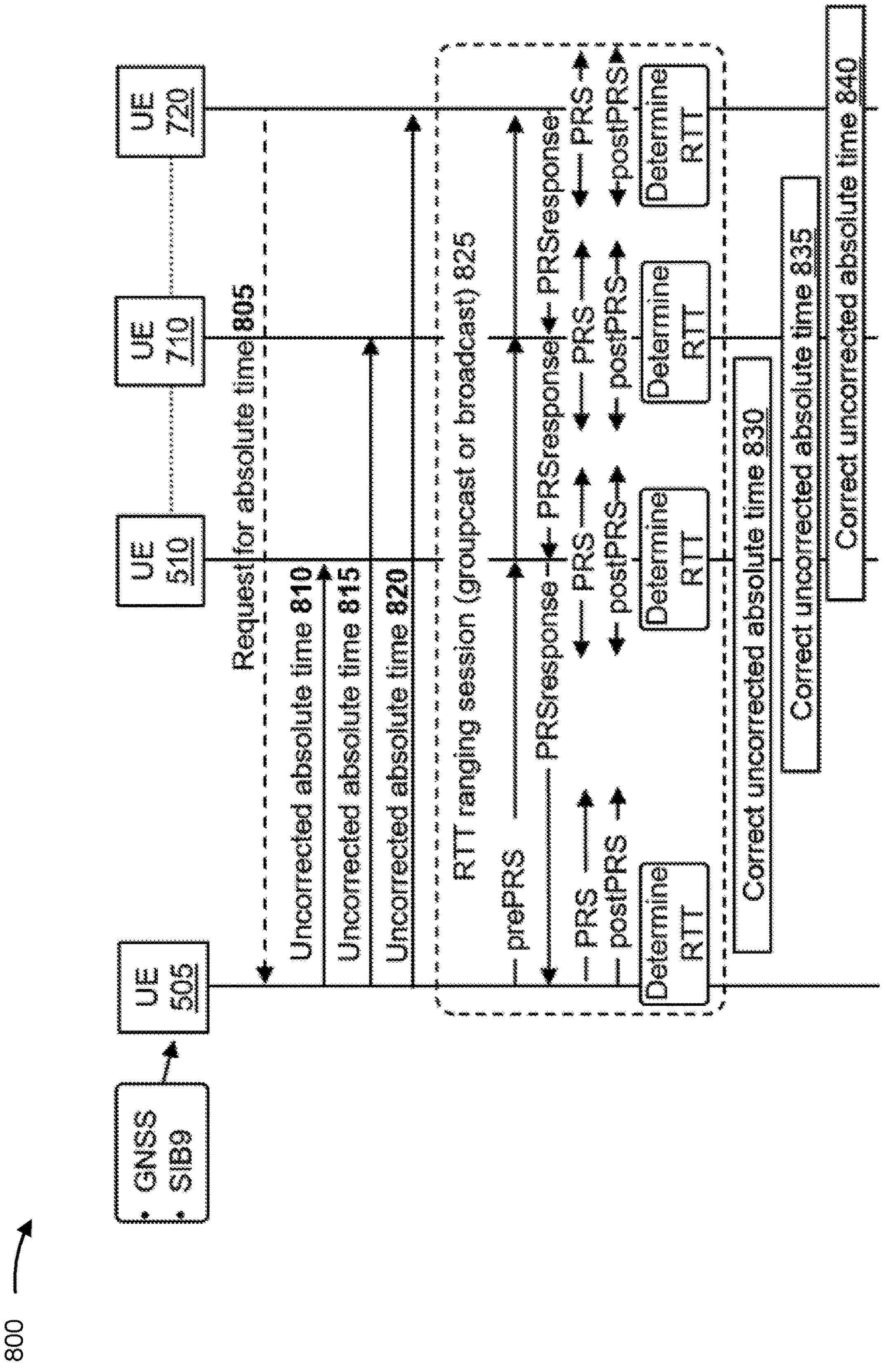
FIG. 8 is a diagram illustrating another example of absolute time distribution to multiple sidelink UEs, in accordance with the present disclosure.

FIG. 8 is a diagram illustrating another example 800 of absolute time distribution to multiple sidelink UEs, in accordance with the present disclosure.

Example 800 shows transmission of the absolute time as an uncorrected absolute time. UE 505 may initiate the distribution of the uncorrected absolute time. Alternatively, in some aspects, UE 510 may initiate distribution of the uncorrected absolute time. As shown by reference number 805, UE 505 may receive a request for the absolute time (from any of the UEs) and generate the uncorrected absolute time in response to the request.

As shown by reference number 810, UE 505 may transmit the uncorrected absolute time to UE 510. As shown by reference number 815, UE 505 may transmit the uncorrected absolute time to UE 710. As shown by reference number 820, UE 505 may transmit the uncorrected absolute time to UE 720. As shown by reference number 825, UE 510, UE 710, and UE 720 may perform the ranging session after receiving the uncorrected absolute time.

Accordingly, as shown by reference number 830, UE 510 may correct the uncorrected absolute time with the propagation delay obtained from the ranging session. As shown by reference number 835, UE 710 may correct the uncorrected absolute time with a propagation delay obtained from the ranging session. As shown by reference number 840, UE 720 may correct the uncorrected absolute time with a propagation delay obtained from the ranging session. Each of the sidelink UEs will now share the same correct absolute time.

As indicated above, FIG. 8 is provided as an example. Other examples may differ from what is described with regard to FIG. 8.

Figure 9:
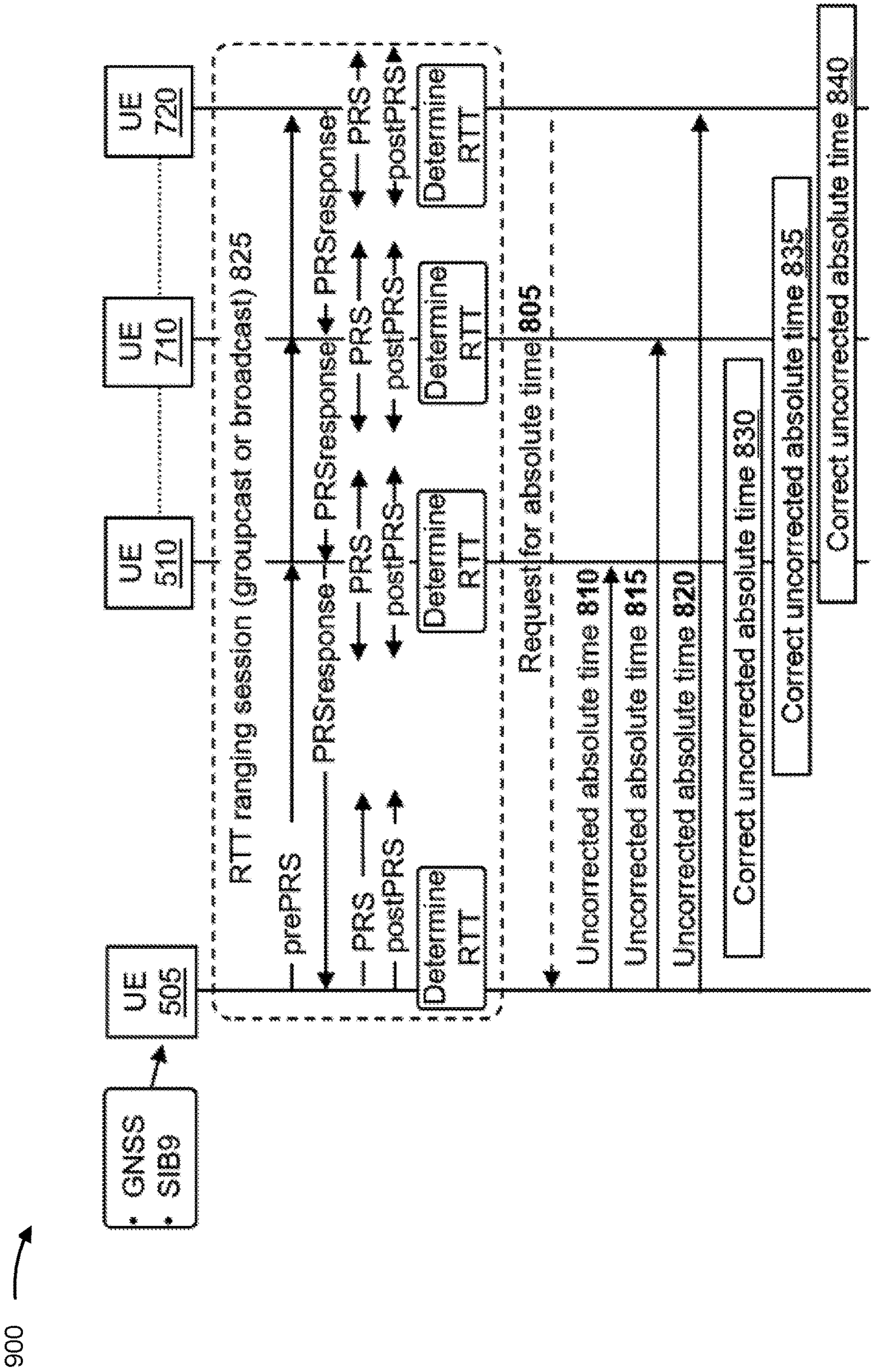
FIG. 9 is a diagram illustrating another example of absolute time distribution to multiple sidelink UEs, in accordance with the present disclosure.

FIG. 9 is a diagram illustrating another example 900 of absolute time distribution to multiple sidelink UEs, in accordance with the present disclosure.

In contrast to example 800 in FIG. 8, example 900 shows transmission of the uncorrected absolute time after the ranging session. That is, the ranging session (shown by reference number 825) may occur before the transmission of the uncorrected absolute time (shown by reference numbers 810. 815, and 820).

As indicated above, FIG. 9 is provided as an example. Other examples may differ from what is described with regard to FIG. 9.

Figure 10:
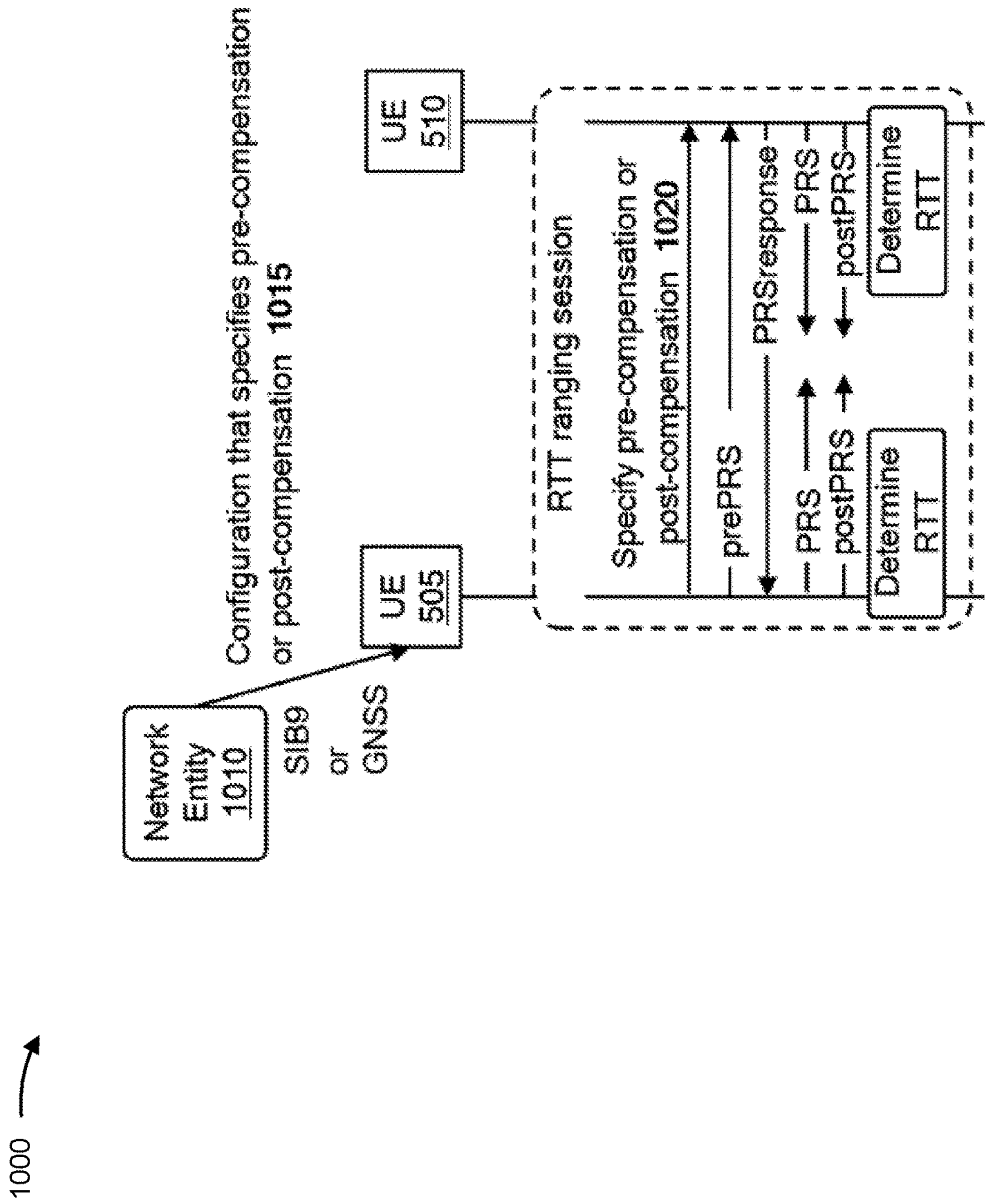
FIG. 10 is a diagram illustrating an example of configuring pre-compensation or post-compensation of absolute time for sidelink UEs, in accordance with the present disclosure.

FIG. 10 is a diagram illustrating an example 1000 of configuring pre-compensation or post-compensation of absolute time for sidelink UEs, in accordance with the present disclosure.

In some aspects, a network entity 1010, such as a base station 110 or a non-terrestrial network entity (e.g., a satellite), may configure the sidelink UEs to perform PDC, including whether the PDC is to be pre-compensation or post-compensation. As shown by reference number 1015, the network entity 1010 may transmit a configuration that specifies pre-compensation or post-compensation. The configuration may be a message that includes a field (e.g., sl-PDCConfiguration) in an IE (e.g., SL-PDCConfiguration). The field may be a Boolean value that indicates whether absolute time distribution is to involve PDC. For example, if the Boolean value is set to true, the absolute time distribution may be PDCed. The Boolean value or another value (e.g., second Boolean value) may be used to indicate whether the PDC is to be pre-compensation or post-compensation. That is, the network entity 1010 may indicate whether UE 505 is to transmit an absolute time (as an uncorrected absolute time) or to transmit a corrected absolute time.

As shown by reference number 1020, UE 505 may specify whether pre-compensation PDC or post-compensation PDC is to be applied in a prePRS message or a separate standalone message. In some aspects, UE 505 may follow the configuration. Alternatively, in some aspects, UE 505 may select pre-compensation PDC or post-compensation PDC in response to receiving an indication to perform PDC but no indication whether to perform pre-compensation PDC or post-compensation PDC. UE 505 may consider post-compensation PDC if a group ranging session is to be performed or if there is traffic congestion.

As indicated above, FIG. 10 is provided as an example. Other examples may differ from what is described with regard to FIG. 10.

Figure 11:
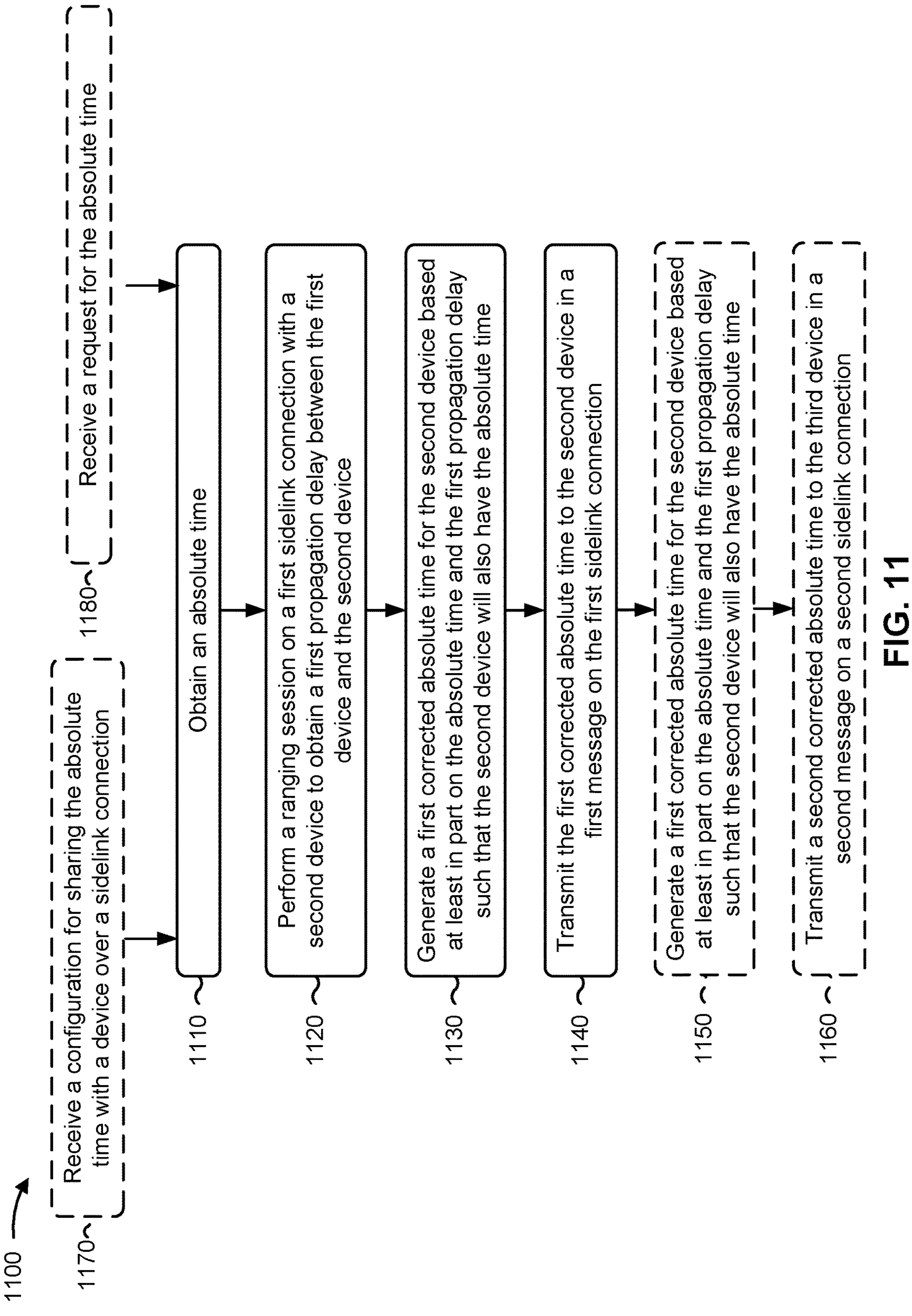
FIG. 11 is a diagram illustrating an example process performed, for example, by a first device, in accordance with the present disclosure.

FIG. 11 is a diagram illustrating an example process 1100 performed, for example, by a first device, in accordance with the present disclosure. Example process 1100 is an example where the first device (e.g., UE 505) performs operations associated with distributing a correct absolute time over sidelink.

As shown in FIG. 11, in some aspects, process 1100 may include obtaining an absolute time (block 1110). For example, the first device (e.g., using communication manager 1608 and/or time component 1610 depicted in FIG. 16) may obtain an absolute time, as described above in connection with FIGS. 4-10.

As further shown in FIG. 11, in some aspects, process 1100 may include performing a ranging session on a first sidelink connection with a second device to obtain a first propagation delay between the first device and the second device (block 1120). For example, the first device (e.g., using communication manager 1608 and/or ranging component 1612 depicted in FIG. 16) may perform a ranging session on a first sidelink connection with a second device to obtain a first propagation delay between the first device and the second device, as described above in connection with FIGS. 4-10.

As further shown in FIG. 11, in some aspects, process 1100 may include generating a first corrected absolute time for the second device based at least in part on the absolute time and the first propagation delay such that the second device will also have the absolute time (block 1130). For example, the first device (e.g., using communication manager 1608 and/or PDC component 1614 depicted in FIG. 16) may generate a first corrected absolute time for the second device based at least in part on the absolute time and the first propagation delay such that the second device will also have the absolute time, as described above in connection with FIGS. 4-10.

As further shown in FIG. 11, in some aspects, process 1100 may include transmitting the first corrected absolute time to the second device in a first message on the first sidelink connection (block 1140). For example, the first device (e.g., using communication manager 1608 and/or transmission component 1604 depicted in FIG. 16) may transmit the first corrected absolute time to the second device in a first message on the first sidelink connection, as described above in connection with FIGS. 4-10.

Process 1100 may include additional aspects, such as any single aspect or any combination of aspects described below and/or in connection with one or more other processes described elsewhere herein.

In a first aspect, performing the ranging session includes performing the ranging session in response to a request from the second device for the absolute time.

In a second aspect, alone or in combination with the first aspect, the ranging session is a sidelink round trip time session.

In a third aspect, alone or in combination with one or more of the first and second aspects, the first message is a PC5 signaling message, a PC5 RRC message, or a PC5 MAC CE.

In a fourth aspect, alone or in combination with one or more of the first through third aspects, the first corrected absolute time is included in an IE.

In a fifth aspect, alone or in combination with one or more of the first through fourth aspects, the first message includes a reference DFN.

In a sixth aspect, alone or in combination with one or more of the first through fifth aspects, the first message includes one or more of an indication of uncertainty for the first corrected absolute time or an indication of a time information type.

In a seventh aspect, alone or in combination with one or more of the first through sixth aspects, the first message includes one or more of an indication of the first propagation delay or an uncertainty value for the first propagation delay.

In an eighth aspect, alone or in combination with one or more of the first through seventh aspects, performing the ranging session includes performing the ranging session on a second sidelink connection with a third device to obtain a second propagation delay between the first device and the third device, where process 1100 further includes generating a second corrected absolute time for the third device based at least in part on the absolute time and the second propagation delay such that the third device will also have the absolute time (block 1150), and transmitting the second corrected absolute time to the third device in a second message on the second sidelink connection (block 1160). For example, the first device (e.g., using communication manager 1608 and/or PDC component 1612 depicted in FIG. 16) may generate a second corrected absolute time for the third device based at least in part on the absolute time and the second propagation delay such that the third device will also have the absolute time. The first device (e.g., using communication manager 1608 and/or transmission component 1604 depicted in FIG. 16) may transmit the second corrected absolute time to a third device in a second message on a second sidelink connection, as described above in connection with FIGS. 4-10. The first sidelink connection and the second sidelink connection may be the same sidelink connection or different connections.

In a ninth aspect, alone or in combination with one or more of the first through eighth aspects, the first device is in a coverage of a network, and the second device is out of coverage of the network.

In a tenth aspect, alone or in combination with one or more of the first through ninth aspects, process 1100 includes receiving, from a network entity, a configuration for sharing the absolute time with a device over a sidelink connection (block 1170), where generating the first corrected absolute time includes generating the first corrected absolute time based at least in part on the configuration. For example, the first device (e.g., using communication manager 1608 and/or reception component 1602 depicted in FIG. 16) may receive, from a network entity, a configuration for sharing the absolute time with a device over a sidelink connection, as described above in connection with FIGS. 4-10.

In an eleventh aspect, alone or in combination with one or more of the first through tenth aspects, the configuration includes a Boolean value to indicate whether the first device is to transmit the absolute time as an uncorrected absolute time or to transmit the corrected absolute time.

In a twelfth aspect, alone or in combination with one or more of the first through eleventh aspects, process 1100 includes receiving a request for the absolute time (block 1180). For example, the first device (e.g., using communication manager 1608 and/or reception component 1602 depicted in FIG. 16) may receive a request for the absolute time, as described above in connection with FIGS. 4-10.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
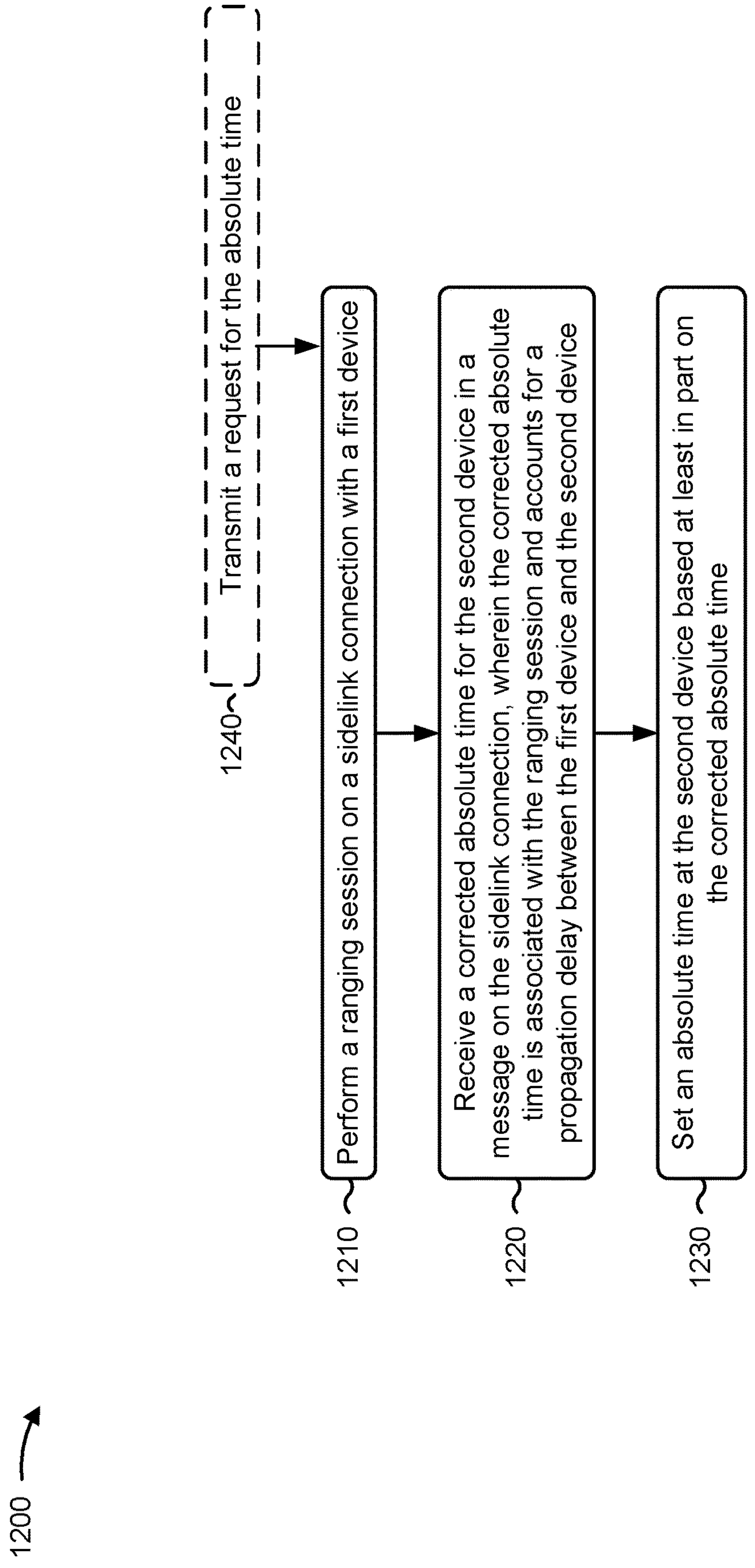
FIG. 12 is a diagram illustrating an example process performed, for example, by a second device, in accordance with the present disclosure.

FIG. 12 is a diagram illustrating an example process 1200 performed, for example, by a second device, in accordance with the present disclosure. Example process 1200 is an example where the second device (e.g., a UE 120, UE 510) performs operations associated with distributing a correct absolute time over sidelink.

As shown in FIG. 12, in some aspects, process 1200 may include performing a ranging session on a sidelink connection with a first device (block 1210). For example, the second device (e.g., using communication manager 1708 and/or ranging component 1710 depicted in FIG. 17) may perform a ranging session on a sidelink connection with a first device, as described above in connection with FIGS. 4-10.

As further shown in FIG. 12, in some aspects, process 1200 may include receiving a corrected absolute time for the second device in a message on the sidelink connection, where the corrected absolute time is associated with the ranging session and accounts for a propagation delay between the first device and the second device (block 1220). For example, the second device (e.g., using communication manager 1708 and/or reception component 1702 depicted in FIG. 17) may receive a corrected absolute time for the second device in a message on the sidelink connection, where the corrected absolute time is associated with the ranging session and accounts for a propagation delay between the first device and the second device, as described above in connection with FIGS. 4-10.

As further shown in FIG. 12, in some aspects, process 1200 may include setting an absolute time at the second device based at least in part on the corrected absolute time (block 1230). For example, the second device (e.g., using communication manager 1708 and/or PDC component 1712 depicted in FIG. 17) may set an absolute time at the second device based at least in part on the corrected absolute time, as described above in connection with FIGS. 4-10.

Process 1200 may include additional aspects, such as any single aspect or any combination of aspects described below and/or in connection with one or more other processes described elsewhere herein.

In a first aspect, process 1200 includes transmitting a request for the absolute time to the first device (block 1240). For example, the second device (e.g., using communication manager 1708 and/or transmission component 1704 depicted in FIG. 17) may transmit a request for the absolute time, as described above in connection with FIGS. 4-10.

In a second aspect, alone or in combination with the first aspect, the message includes a reference DFN, and setting the absolute time includes setting the absolute time using the corrected absolute time in reference to the DFN.

In a third aspect, alone or in combination with one or more of the first and second aspects, the message includes one or more of an indication of uncertainty for the corrected absolute time or an indication of a time information type.

In a fourth aspect, alone or in combination with one or more of the first through third aspects, the message includes one or more of an indication of the propagation delay or an uncertainty value for the propagation delay.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
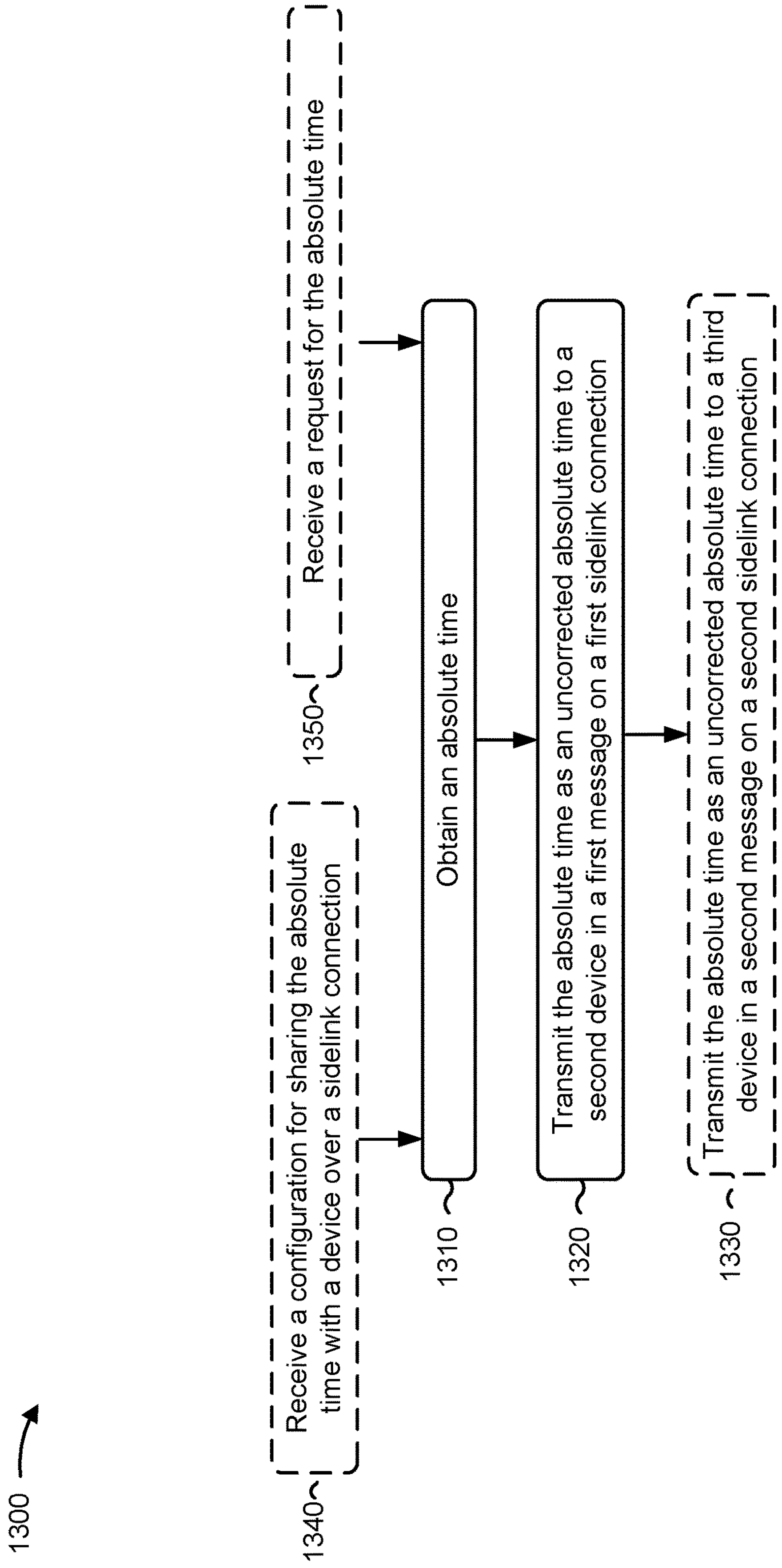
FIG. 13 is a diagram illustrating an example process performed, for example, by a first device, in accordance with the present disclosure.

FIG. 13 is a diagram illustrating an example process 1300 performed, for example, by a first device, in accordance with the present disclosure. Example process 1300 is an example where the first device (e.g., a UE 120, UE 505) performs operations associated with distributing a correct absolute time over sidelink.

As shown in FIG. 13, in some aspects, process 1300 may include obtaining an absolute time (block 1310). For example, the first device (e.g., using communication manager 1608 and/or time component 1610 depicted in FIG. 16) may obtain an absolute time, as described above in connection with FIGS. 4-10.

As further shown in FIG. 13, in some aspects, process 1300 may include transmitting the absolute time as an uncorrected absolute time to a second device in a first message on a first sidelink connection (block 1320). For example, the first device (e.g., using communication manager 1608 and/or transmission component 1604 depicted in FIG. 16) may transmit the absolute time as an uncorrected absolute time to a second device in a first message on a first sidelink connection, as described above in connection with FIGS. 4-10.

Process 1300 may include additional aspects, such as any single aspect or any combination of aspects described below and/or in connection with one or more other processes described elsewhere herein.

In a first aspect, the first message is a PC5 signaling message, a PC5 RRC message, or a PC5 MAC CE.

In a second aspect, alone or in combination with the first aspect, the uncorrected absolute time is included in an IE.

In a third aspect, alone or in combination with one or more of the first and second aspects, the first message includes a reference DFN.

In a fourth aspect, alone or in combination with one or more of the first through third aspects, the first message includes one or more of an indication of uncertainty for the uncorrected absolute time or an indication of a time information type.

In a fifth aspect, alone or in combination with one or more of the first through fourth aspects, process 1300 includes transmitting the uncorrected absolute time to a third device in a second message on a second sidelink connection (block 1330). For example, the first device (e.g., using communication manager 1608 and/or transmission component 1604 depicted in FIG. 16) may transmit the uncorrected absolute time to a third device in a second message on a second sidelink connection, as described above in connection with FIGS. 4-10. The first sidelink connection and the second sidelink connection may be the same sidelink connection or different connections.

In a sixth aspect, alone or in combination with one or more of the first through fifth aspects, the first message is a broadcast message or a groupcast message.

In a seventh aspect, alone or in combination with one or more of the first through sixth aspects, process 1300 includes receiving, from a network entity, a configuration for sharing the absolute time with a device over a sidelink connection (block 1340), where transmitting the uncorrected absolute time includes transmitting the uncorrected absolute time based at least in part on the configuration. For example, the first device (e.g., using communication manager 1608 and/or reception component 1602 depicted in FIG. 16) may receive, from a network entity, a configuration for sharing the absolute time with a device over a sidelink connection, as described above in connection with FIGS. 4-10.

In an eighth aspect, alone or in combination with one or more of the first through seventh aspects, the configuration includes a Boolean value to indicate whether the first device is to transmit the uncorrected absolute time or to transmit a corrected absolute time.

In a ninth aspect, alone or in combination with one or more of the first through eighth aspects, process 1300 includes receiving a request for the absolute time (block 1350). For example, the first device (e.g., using communication manager 1608 and/or reception component 1602 depicted in FIG. 16) may receive a request for the absolute time, as described above in connection with FIGS. 4-10.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
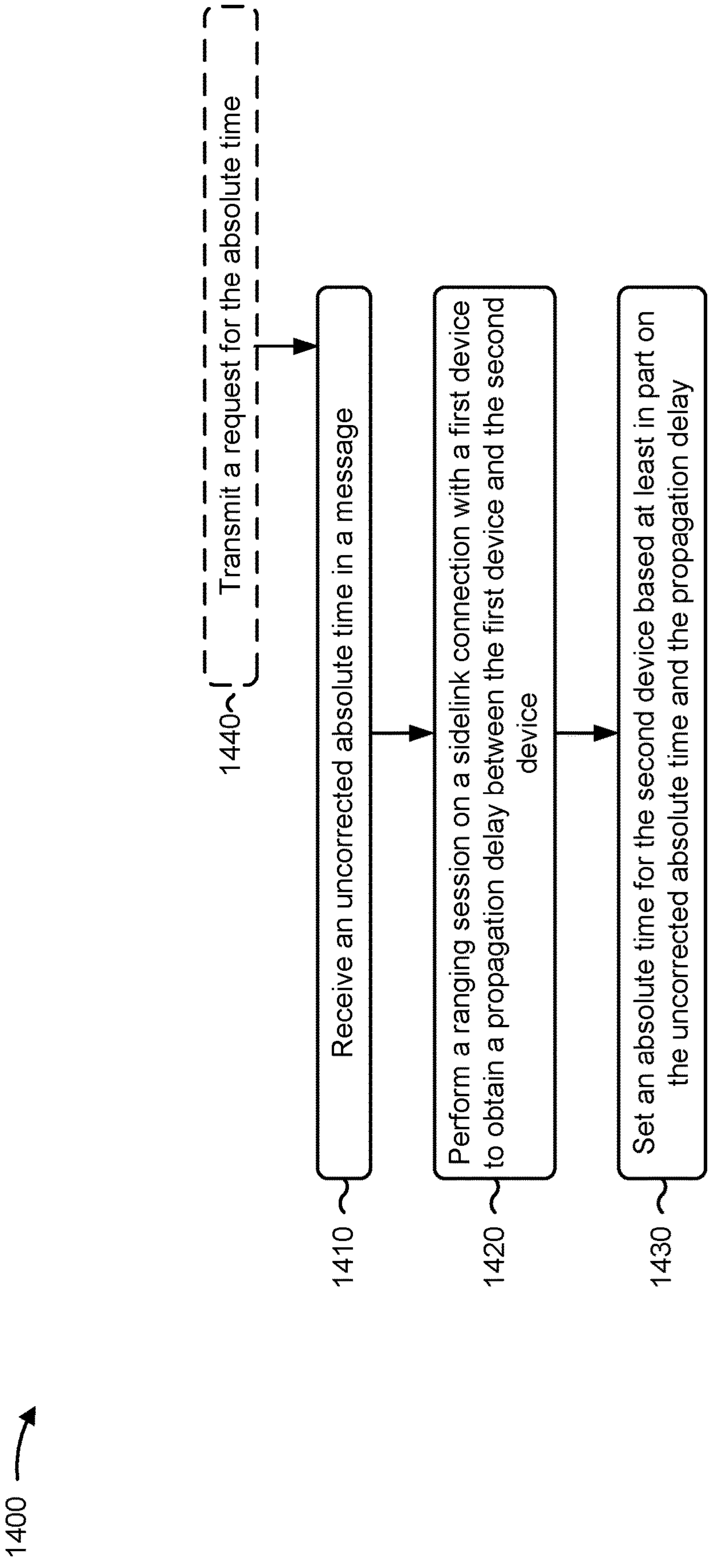
FIG. 14 is a diagram illustrating an example process performed, for example, by a second device, in accordance with the present disclosure.

FIG. 14 is a diagram illustrating an example process 1400 performed, for example, by a second device, in accordance with the present disclosure. Example process 1400 is an example where the second device (e.g., a UE 120, UE 510) performs operations associated with distributing a correct absolute time over sidelink.

As shown in FIG. 14, in some aspects, process 1400 may include receiving an uncorrected absolute time in a message (block 1410). For example, the second device (e.g., using communication manager 1608 and/or reception component 1602 depicted in FIG. 16) may receive an uncorrected absolute time in a message, as described above.

As further shown in FIG. 14, in some aspects, process 1400 may include performing a ranging session on a sidelink connection with a first device to obtain a propagation delay between the first device and the second device (block 1420). For example, the second device (e.g., using communication manager 1608 and/or ranging component 1612 depicted in FIG. 16) may perform a ranging session on a sidelink connection with a first device to obtain a propagation delay between the first device and the second device, as described above.

As further shown in FIG. 14, in some aspects, process 1400 may include setting an absolute time for the second device based at least in part on the uncorrected absolute time and the propagation delay (block 1430). For example, the second device (e.g., using communication manager 1608 and/or PDC component 1612 depicted in FIG. 16) may set an absolute time for the second device based at least in part on the uncorrected absolute time and the propagation delay, as described above.

Process 1400 may include additional aspects, such as any single aspect or any combination of aspects described below and/or in connection with one or more other processes described elsewhere herein.

In a first aspect, process 1400 includes transmitting a request for the uncorrected absolute time (block 1440). For example, the second device (e.g., using communication manager 1708 and/or transmission component 1704 depicted in FIG. 17) may transmit a request for the absolute time, as described above in connection with FIGS. 4-10.

In a second aspect, alone or in combination with the first aspect, the message includes a reference DFN, and setting the absolute time includes setting the absolute time based at least in part on the DFN.

In a third aspect, alone or in combination with one or more of the first and second aspects, the message includes one or more of an indication of uncertainty for the uncorrected absolute time or an indication of a time information type.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
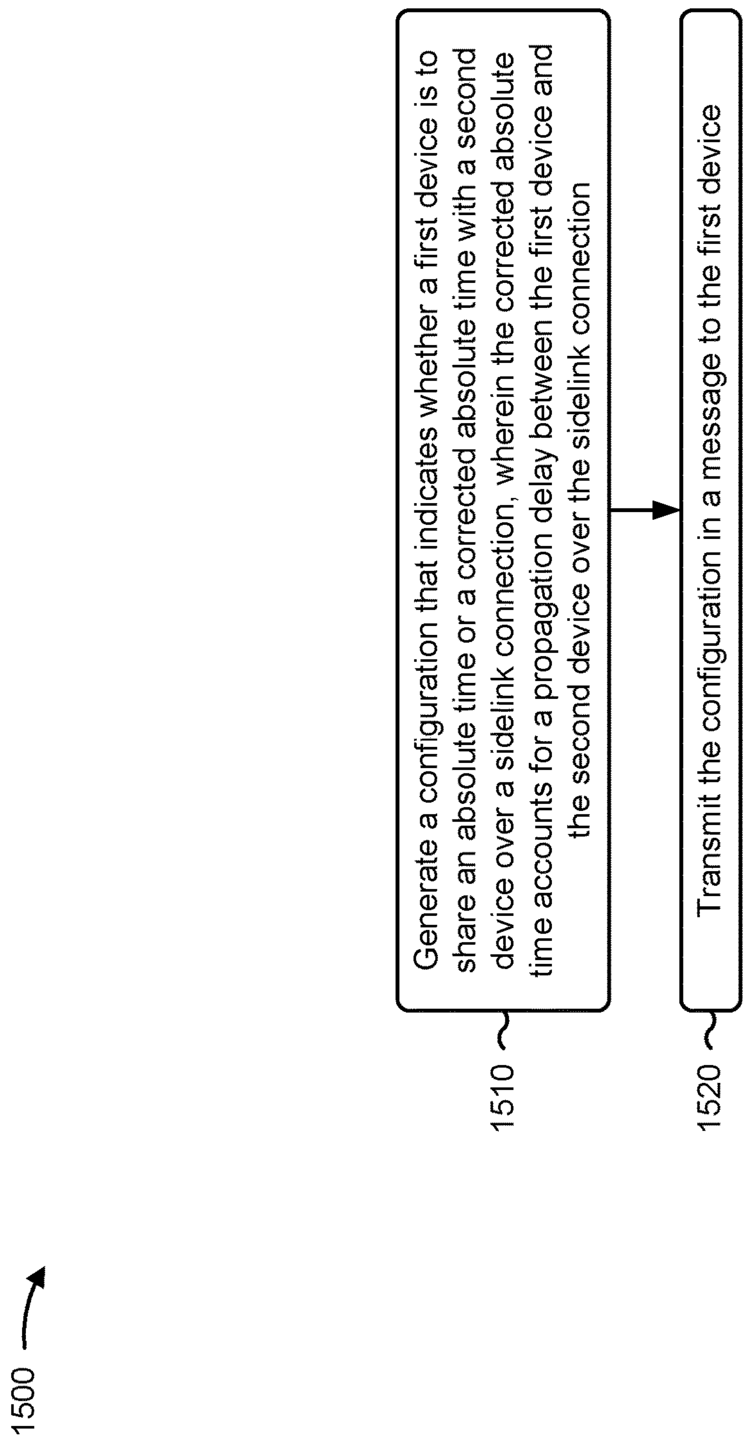
FIG. 15 is a diagram illustrating an example process performed, for example, by a network entity, in accordance with the present disclosure.

FIG. 15 is a diagram illustrating an example process 1500 performed, for example, by a network entity, in accordance with the present disclosure. Example process 1500 is an example where the network entity (e.g., a base station 110, network entity 1010) performs operations associated with configuring the distribution of a correct absolute time over sidelink.

As shown in FIG. 15, in some aspects, process 1500 may include generating a configuration that indicates whether a first device is to share an absolute time or a corrected absolute time with a second device over a sidelink connection, where the corrected absolute time accounts for a propagation delay between the first device and the second device over the sidelink connection (block 1510). For example, the network entity (e.g., using communication manager 1808 and/or configuration component 1810 depicted in FIG. 18) may generate a configuration that indicates whether a first device is to share an absolute time or a corrected absolute time with a second device over a sidelink connection, where the corrected absolute time accounts for a propagation delay between the first device and the second device over the sidelink connection, as described above.

As further shown in FIG. 15, in some aspects, process 1500 may include transmitting the configuration in a message to the first device (block 1520). For example, the network entity (e.g., using communication manager 1808 and/or transmission component 1804 depicted in FIG. 18) may transmit the configuration in a message to the first device, as described above.

Process 1500 may include additional aspects, such as any single aspect or any combination of aspects described below and/or in connection with one or more other processes described elsewhere herein.

In a first aspect, sharing the absolute time is associated with a post-compensation configuration, and sharing the corrected absolute time is associated with a pre-compensation configuration.

In a second aspect, alone or in combination with the first aspect, the configuration includes a Boolean value to indicate whether the first device is to transmit the absolute time as an uncorrected absolute time or to transmit the corrected absolute time.

In a third aspect, alone or in combination with one or more of the first and second aspects, the absolute time or the corrected absolute time is included in an IE.

In a fourth aspect, alone or in combination with one or more of the first through third aspects, the message is a PC5 signaling message, a PC5 RRC message, or a PC5 MAC CE.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
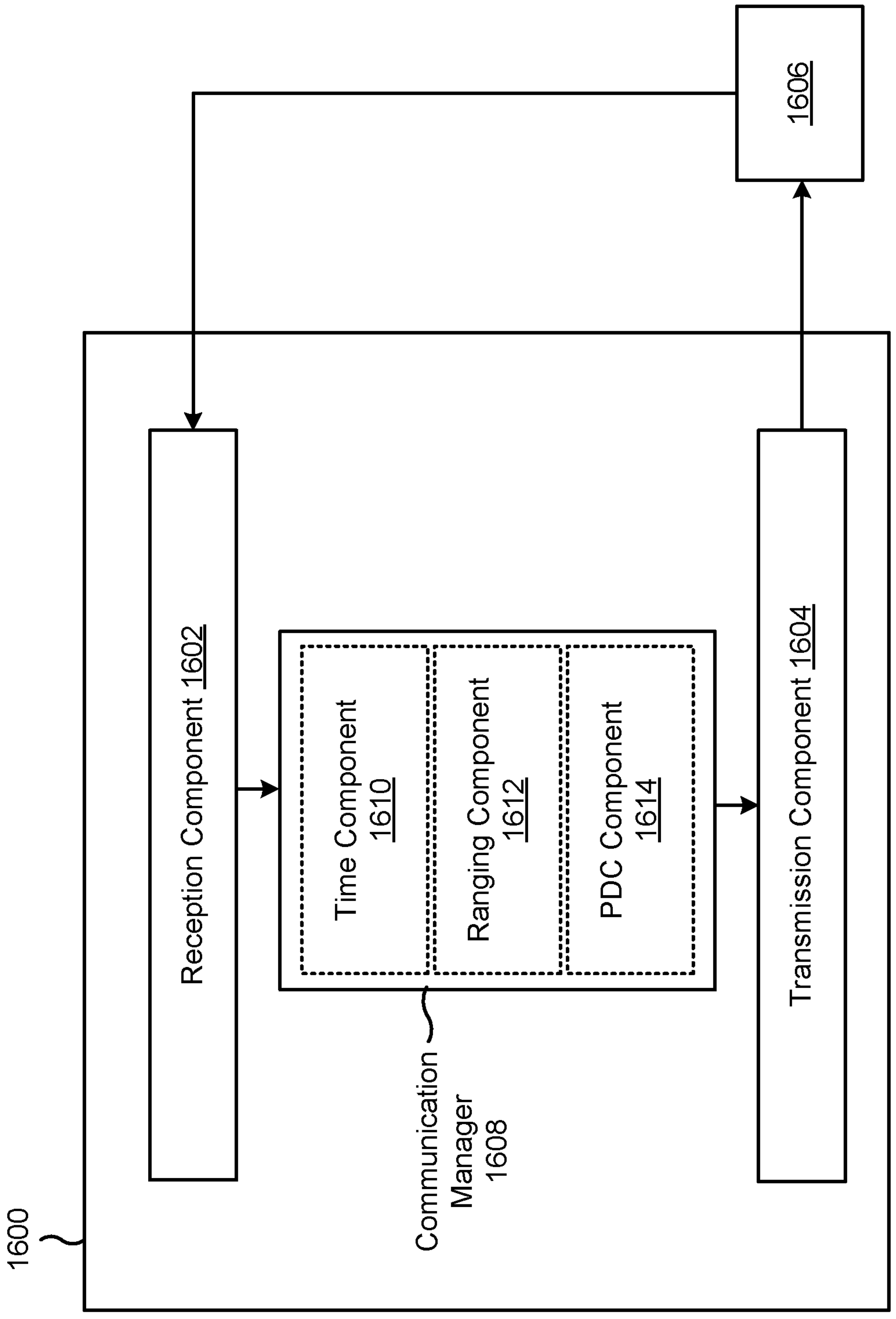
FIGS. 16-18 are diagrams of example apparatuses for wireless communication, in accordance with the present disclosure.

FIG. 16 is a diagram of an example apparatus 1600 for wireless communication. The apparatus 1600 may be a first device (e.g., a UE 120, UE 505), or a first device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, network entity, or another wireless communication device) using the reception component 1602 and the transmission component 1604. As further shown, the apparatus 1600 may include the communication manager 1608. The communication manager 1608 may control and/or otherwise manage one or more operations of the reception component 1602 and/or the transmission component 1604. In some aspects, the communication manager 1608 may include one or more antennas, a modem, a controller/processor, a memory, or a combination thereof, of the UE described in connection with FIG. 2. The communication manager 1608 may be, or be similar to, the communication manager 140 depicted in FIGS. 1 and 2. For example, in some aspects, the communication manager 1608 may be configured to perform one or more of the functions described as being performed by the communication manager 140. In some aspects, the communication manager 1608 may include the reception component 1602 and/or the transmission component 1604. The communication manager 1608 may include a time component 1610, a ranging component 1612, and/or a PDC component 1614, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1100 of FIG. 11, process 1300 of FIG. 13, or a combination thereof. In some aspects, the apparatus 1600 and/or one or more components shown in FIG. 16 may include one or more components of the first device described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the first device described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the first device described in connection with FIG. 2. In some aspects, the transmission component 1604 may be co-located with the reception component 1602 in a transceiver.

The time component 1610 may obtain an absolute time. The ranging component 1612 may perform a ranging session on a first sidelink connection with a second device to obtain a first propagation delay between the first device and the second device. PDC component 1614 may generate a first corrected absolute time for the second device based at least in part on the absolute time and the first propagation delay such that the second device will also have the absolute time. The transmission component 1604 may transmit the first corrected absolute time to the second device in a first message on the first sidelink connection.

The reception component 1602 may receive, from a network entity, a configuration for sharing the absolute time with a device over a sidelink connection. PDC component 1614 may generate the first corrected absolute time based at least in part on the configuration.

In some aspect, the time component 1610 may obtain an absolute time. The transmission component 1604 may transmit the absolute time as an uncorrected absolute time to a second device in a first message on a first sidelink connection. The transmission component 1604 may transmit the uncorrected absolute time to a third device in a second message on a second sidelink connection.

The reception component 1602 may receive, from a network entity, a configuration for sharing the absolute time with a device over a sidelink connection. The PDC component 1614 and the transmission component 1604 may transmit the uncorrected absolute time based at least in part on the configuration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
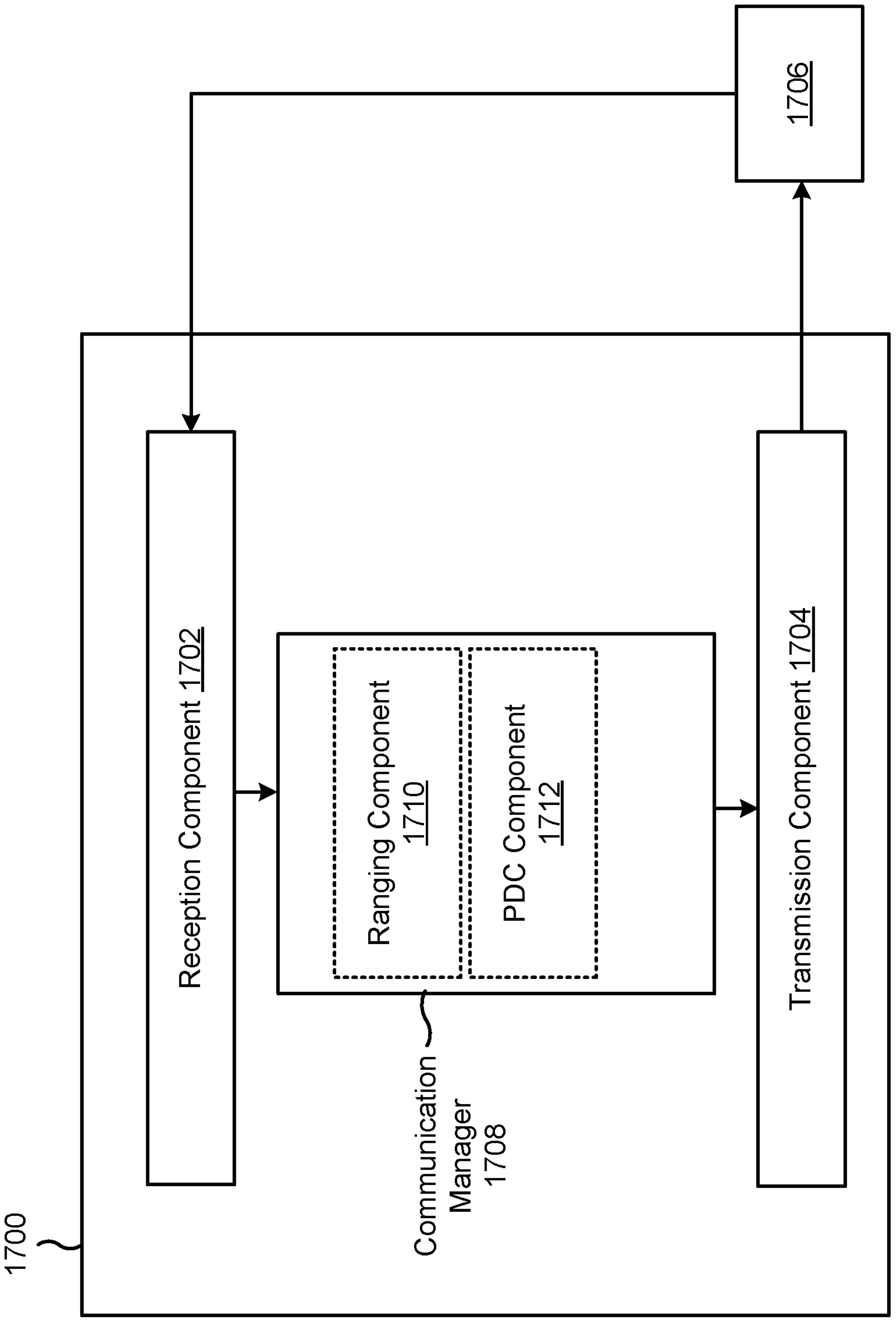

FIG. 17 is a diagram of an example apparatus 1700 for wireless communication. The apparatus 1700 may be a second device (e.g., a UE 120, UE 510), or a second device may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, network entity, or another wireless communication device) using the reception component 1702 and the transmission component 1704. As further shown, the apparatus 1700 may include the communication manager 1708. The communication manager 1708 may control and/or otherwise manage one or more operations of the reception component 1702 and/or the transmission component 1704. In some aspects, the communication manager 1708 may include one or more antennas, a modem, a controller/processor, a memory, or a combination thereof, of the UE described in connection with FIG. 2. The communication manager 1708 may be, or be similar to, the communication manager 140 depicted in FIGS. 1 and 2. For example, in some aspects, the communication manager 1708 may be configured to perform one or more of the functions described as being performed by the communication manager 140. In some aspects, the communication manager 1708 may include the reception component 1702 and/or the transmission component 1704. The communication manager 1708 may include a ranging component 1710, and/or a PDC component 1712, among other examples.

In some aspects, the apparatus 1700 may be configured to perform one or more operations described herein in connection with FIGS. 1-10. Additionally, or alternatively, the apparatus 1700 may be configured to perform one or more processes described herein, such as process 1200 of FIG. 12, process 1400 of FIG. 14, or a combination thereof. In some aspects, the apparatus 1700 and/or one or more components shown in FIG. 17 may include one or more components of the second device described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the second device described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the second device described in connection with FIG. 2. In some aspects, the transmission component 1704 may be co-located with the reception component 1702 in a transceiver.

The ranging component 1710 may perform a ranging session on a sidelink connection with a first device. The reception component 1702 may receive a corrected absolute time for the second device in a message on the sidelink connection, where the corrected absolute time is associated with the ranging session and accounts for a propagation delay between the first device and the second device. The PDC component 1712 may set an absolute time at the second device based at least in part on the corrected absolute time. The transmission component 1704 may transmit a request for the absolute time to the first device.

In some aspects, the reception component 1702 may receive an uncorrected absolute time in a message. The ranging component 1710 may perform a ranging session on a sidelink connection with a first device to obtain a propagation delay between the first device and the second device. The PDC component 1712 may set an absolute time for the second device based at least in part on the uncorrected absolute time and the propagation delay. The transmission component 1704 may transmit a request for the uncorrected absolute time.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
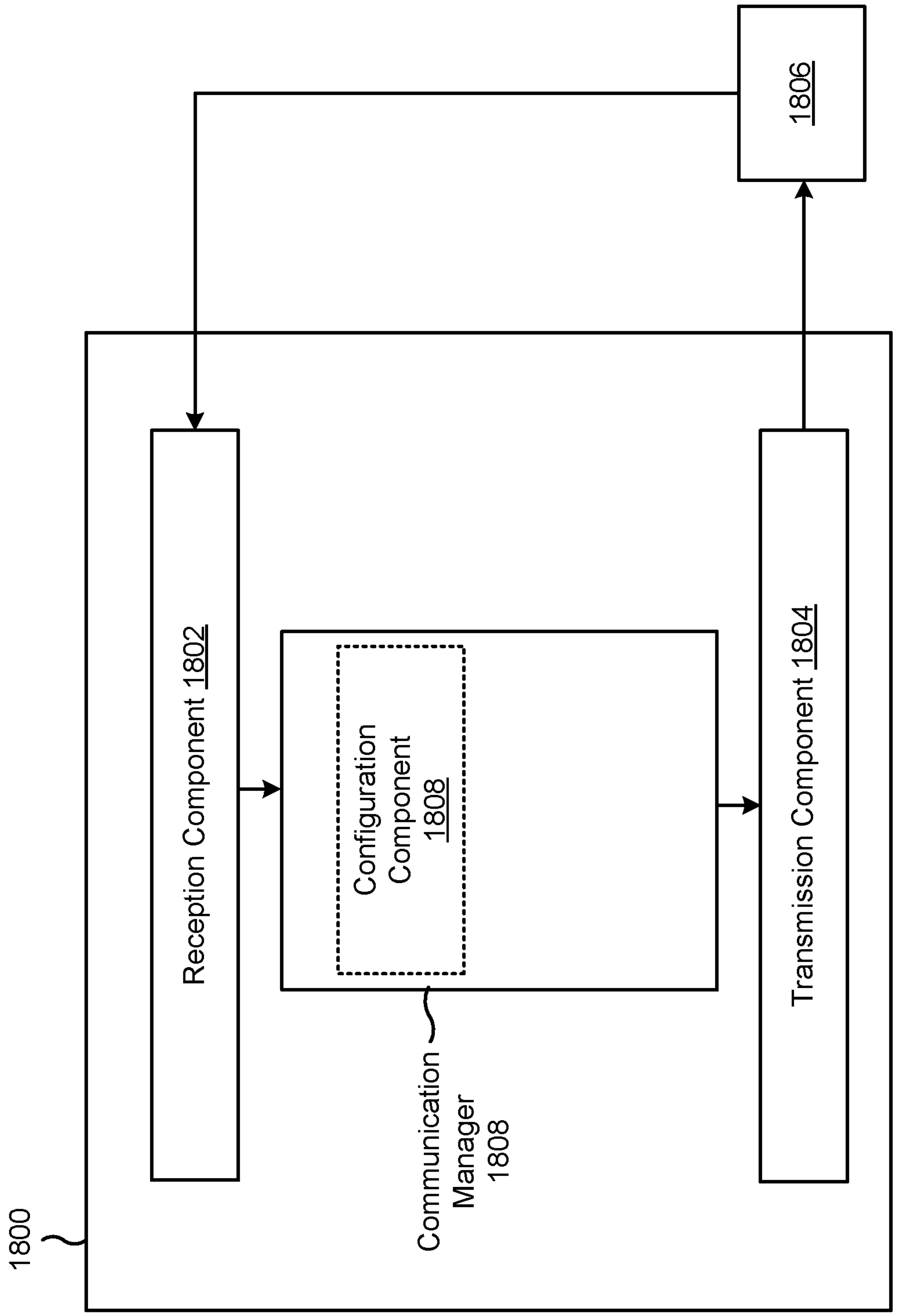

FIG. 18 is a diagram of an example apparatus 1800 for wireless communication. The apparatus 1800 may be a network entity (e.g., a base station 110, network entity 1010), or a network entity may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, network entity, or another wireless communication device) using the reception component 1802 and the transmission component 1804. As further shown, the apparatus 1800 may include the communication manager 1808. The communication manager 1808 may control and/or otherwise manage one or more operations of the reception component 1802 and/or the transmission component 1804. In some aspects, the communication manager 1808 may include one or more antennas, a modem, a controller/processor, a memory, or a combination thereof, of the base station described in connection with FIG. 2. The communication manager 1808 may be, or be similar to, the communication manager 150 depicted in FIGS. 1 and 2. For example, in some aspects, the communication manager 1808 may be configured to perform one or more of the functions described as being performed by the communication manager 150. In some aspects, the communication manager 1808 may include the reception component 1802 and/or the transmission component 1804. The communication manager 1808 may include a configuration component 1810, among other examples.

In some aspects, the apparatus 1800 may be configured to perform one or more operations described herein in connection with FIGS. 1-10. Additionally, or alternatively, the apparatus 1800 may be configured to perform one or more processes described herein, such as process 1500 of FIG. 15. In some aspects, the apparatus 1800 and/or one or more components shown in FIG. 18 may include one or more components of the network entity described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the network entity described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the network entity described in connection with FIG. 2. In some aspects, the transmission component 1804 may be co-located with the reception component 1802 in a transceiver.

The configuration component 1810 may generate a configuration that indicates whether a first device is to share an absolute time or a corrected absolute time with a second device over a sidelink connection, where the corrected absolute time accounts for a propagation delay between the first device and the second device over the sidelink connection. The transmission component 1804 may transmit the configuration in a message to the first device.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a first device, comprising: obtaining an absolute time; performing a ranging session on a first sidelink connection with a second device to obtain a first propagation delay between the first device and the second device; generating a first corrected absolute time for the second device based at least in part on the absolute time and the first propagation delay such that the second device will also have the absolute time; and transmitting the first corrected absolute time to the second device in a first message on the first sidelink connection.

Aspect 2: The method of Aspect 1, wherein performing the ranging session includes performing the ranging session in response to a request from the second device for the absolute time.

Aspect 3: The method of Aspect 1 or 2, wherein the ranging session is a sidelink round trip time session.

Aspect 4: The method of any of Aspects 1-3, wherein the first message is a PC5 signaling message, a PC5 radio resource control (RRC) message, or a PC5 medium access control control element (MAC CE).

Aspect 5: The method of any of Aspects 1-4, wherein the first corrected absolute time is included in an information element.

Aspect 6: The method of any of Aspects 1-5, wherein the first message includes a reference distributed frame number.

Aspect 7: The method of any of Aspects 1-6, wherein the first message includes one or more of an indication of uncertainty for the first corrected absolute time or an indication of a time information type Aspect 8: The method of any of Aspects 1-7, wherein the first message includes one or more of an indication of the first propagation delay or an uncertainty value for the first propagation delay.

Aspect 9: The method of any of Aspects 1-8, wherein performing the ranging session includes performing the ranging session on a second sidelink connection with a third device to obtain a second propagation delay between the first device and the third device, wherein the method further includes: generating a second corrected absolute time for the third device based at least in part on the absolute time and the second propagation delay such that the third device will also have the absolute time; and transmitting the second corrected absolute time to the third device in a second message on the second sidelink connection.

Aspect 10: The method of any of Aspects 1-9, wherein the first device is in a coverage of a network, and the second device is out of coverage of the network.

Aspect 11: The method of any of Aspects 10, further comprising receiving, from a network entity, a configuration for sharing the absolute time with a device over a sidelink connection, wherein generating the first corrected absolute time includes generating the first corrected absolute time based at least in part on the configuration.

Aspect 12: The method of any of Aspects 1-11, wherein the configuration includes a Boolean value to indicate whether the first device is to transmit the absolute time as an uncorrected absolute time or to transmit the corrected absolute time.

Aspect 13: A method of wireless communication performed by a second device, comprising: performing a ranging session on a sidelink connection with a first device; receiving a corrected absolute time for the second device in a message on the sidelink connection, wherein the corrected absolute time is associated with the ranging session and accounts for a propagation delay between the first device and the second device; and setting an absolute time at the second device based at least in part on the corrected absolute time.

Aspect 14: The method of Aspect 13, further comprising transmitting a request for the absolute time to the first device.

Aspect 15: The method of Aspect 13 or 14, wherein the message includes a reference distributed frame number (DFN), and wherein setting the absolute time includes setting the absolute time using the corrected absolute time in reference to the DFN.

Aspect 16: The method of any of Aspects 13-15, wherein the message includes one or more of an indication of uncertainty for the corrected absolute time or an indication of a time information type.

Aspect 17: The method of any of Aspects 13-16, wherein the message includes one or more of an indication of the propagation delay or an uncertainty value for the propagation delay.

Aspect 18: A method of wireless communication performed by a first device, comprising: obtaining an absolute time; and transmitting the absolute time as an uncorrected absolute time to a second device in a first message on a first sidelink connection.

Aspect 19: The method of Aspect 18, wherein the first message is a PC5 signaling message, a PC5 radio resource control (RRC) message, or a PC5 medium access control control element (MAC CE).

Aspect 20: The method of Aspect 18 or 19, wherein the uncorrected absolute time is included in an information element.

Aspect 21: The method of any of Aspects 18-20, wherein the first message includes a reference distributed frame number.

Aspect 22: The method of any of Aspects 18-21, wherein the first message includes one or more of an indication of uncertainty for the uncorrected absolute time or an indication of a time information type.

Aspect 23: The method of any of Aspects 18-22, further comprising transmitting the uncorrected absolute time to a third device in a second message on a second sidelink connection.

Aspect 24: The method of any of Aspects 18-23, wherein the first message is a broadcast message or a groupcast message.

Aspect 25: The method of any of Aspects 18-24, further comprising receiving, from a network entity, a configuration for sharing the absolute time with a device over a sidelink connection, wherein transmitting the uncorrected absolute time includes transmitting the uncorrected absolute time based at least in part on the configuration.

Aspect 26: The method of any of Aspects 18-25, wherein the configuration includes a Boolean value to indicate whether the first device is to transmit the uncorrected absolute time or to transmit a corrected absolute time.

Aspect 27: A method of wireless communication performed by a second device, comprising: receiving an uncorrected absolute time in a message; performing a ranging session on a sidelink connection with a first device to obtain a propagation delay between the first device and the second device; and setting an absolute time for the second device based at least in part on the uncorrected absolute time and the propagation delay.

Aspect 28: The method of Aspect 27, further comprising transmitting a request for the uncorrected absolute time.

Aspect 29: The method of Aspect 27 or 28, wherein the message includes a reference distributed frame number (DFN), and wherein setting the absolute time includes setting the absolute time based at least in part on the DFN.

Aspect 30: The method of any of Aspects 27-29, wherein the message includes one or more of an indication of uncertainty for the uncorrected absolute time or an indication of a time information type.

Aspect 31: A method of wireless communication performed by a network entity, comprising: generating a configuration that indicates whether a first device is to share an absolute time or a corrected absolute time with a second device over a sidelink connection, wherein the corrected absolute time accounts for a propagation delay between the first device and the second device over the sidelink connection; and transmitting the configuration in a message to the first device.

Aspect 32: The method of Aspect 31, wherein sharing the absolute time is associated with a post-compensation configuration, and wherein sharing the corrected absolute time is associated with a pre-compensation configuration.

Aspect 33: The method of Aspect 31 or 32, wherein the configuration includes a Boolean value to indicate whether the first device is to transmit the absolute time as an uncorrected absolute time or to transmit the corrected absolute time.

Aspect 34: The method of any of Aspects 31-33, wherein the absolute time or the corrected absolute time is included in an information element.

Aspect 35: The method of any of Aspects 31-34, wherein the message is a PC5 signaling message, a PC5 radio resource control (RRC) message, or a PC5 medium access control control element (MAC CE).

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising a memory and one or more processors coupled to the memory, the one or more processors configured to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by a processor to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
a memory; and
one or more processors, coupled to the memory, configured to:
obtain an absolute time;
perform a ranging session on a first sidelink connection with a second device to obtain a first propagation delay between the first device and the second device;
generate a first corrected absolute time for the second device based at least in part on the absolute time and the first propagation delay such that the second device will also have the absolute time; and
transmit the first corrected absolute time to the second device in a first message on the first sidelink connection.

2. The first device of claim 1, wherein the one or more processors, to perform the ranging session, are configured to perform the ranging session in response to a request from the second device for the absolute time.

3. The first device of claim 1, wherein the ranging session is a sidelink round trip time session.

4. The first device of claim 1, wherein the first message is a PC5 signaling message, a PC5 radio resource control (RRC) message, or a PC5 medium access control control element (MAC CE).

5. The first device of claim 1, wherein the first corrected absolute time is included in an information element.

6. The first device of claim 1, wherein the first message includes a reference distributed frame number.

7. The first device of claim 1, wherein the first message includes one or more of an indication of uncertainty for the first corrected absolute time or an indication of a time information type.

8. The first device of claim 1, wherein the first message includes one or more of an indication of the first propagation delay or an uncertainty value for the first propagation delay.

9. The first device of claim 1, wherein to perform the ranging session, the one of more processors are configured to perform the ranging session on a second sidelink connection with a third device to obtain a second propagation delay between the first device and the third device, and wherein the one or more processors are configured to:
generate a second corrected absolute time for the third device based at least in part on the absolute time and the second propagation delay such that the third device will also have the absolute time; and
transmit the second corrected absolute time to the third device in a second message on the second sidelink connection.

10. The first device of claim 1, wherein the first device is in a coverage of a network, and the second device is out of coverage of the network.

11. The first device of claim 1, wherein the one or more processors are configured to receive, from a network entity, a configuration for sharing the absolute time with a device over a sidelink connection, and wherein the one or more processors, to generate the first corrected absolute time, are configured to generate the first corrected absolute time based at least in part on the configuration.

12. The first device of claim 11, wherein the configuration includes a Boolean value to indicate whether the first device is to transmit the absolute time as an uncorrected absolute time or to transmit the corrected absolute time.

13. An apparatus for wireless communication, comprising:
a memory; and
one or more processors, coupled to the memory, configured to:
perform a ranging session on a sidelink connection with a first device;
receive a corrected absolute time for the apparatus in a message on the sidelink connection, wherein the corrected absolute time is associated with the ranging session and accounts for a propagation delay between the first device and the apparatus; and set an absolute time at the apparatus based at least in part on the corrected absolute time.

14. The apparatus of claim 13, wherein the one or more processors are configured to transmit a request for the absolute time to the first device.

15. The apparatus of claim 13, wherein the message includes a reference distributed frame number (DFN), and wherein setting the absolute time includes setting the absolute time using the corrected absolute time in reference to the DFN.

16. The apparatus of claim 13, wherein the message includes one or more of an indication of uncertainty for the corrected absolute time or an indication of a time information type.

17. The apparatus of any of claim 13, wherein the message includes one or more of an indication of the propagation delay or an uncertainty value for the propagation delay.

18. A first device for wireless communication, comprising:
a memory; and
one or more processors, coupled to the memory, configured to:
obtain an absolute time; and
transmit the absolute time as an uncorrected absolute time to a second device in a first message on a first sidelink connection.

19. The first device of claim 18, wherein the first message is a PC5 signaling message, a PC5 radio resource control (RRC) message, or a PC5 medium access control control element (MAC CE).

20. The first device of claim 18, wherein the uncorrected absolute time is included in an information element.

21. The first device of claim 18, wherein the first message includes a reference distributed frame number.

22. The first device of any of claim 18, wherein the first message includes one or more of an indication of uncertainty for the uncorrected absolute time or an indication of a time information type.

23. The first device of any of claim 18, wherein the one or more processors are configured to transmit the uncorrected absolute time to a third device in a second message on a second sidelink connection.

24. The first device of claim 18, wherein the first message is a broadcast message or a groupcast message.

25. The first device of claim 18, wherein the one or more processors are configured to receive, from a network entity, a configuration for sharing the absolute time with a device over a sidelink connection, and wherein the one or more processors, to transmit the uncorrected absolute time, are configured to transmit the uncorrected absolute time based at least in part on the configuration.

26. The first device of claim 18, wherein the configuration includes a Boolean value to indicate whether the first device is to transmit theuncorrected absolute time or to transmit a corrected absolute time.

27. An apparatus for wireless communication, comprising:
a memory; and
one or more processors, coupled to the memory, configured to:
receive an uncorrected absolute time in a message;
perform a ranging session on a sidelink connection with a first device to obtain a propagation delay between the first device and the apparatus; and
set an absolute time for the apparatus based at least in part on the uncorrected
absolute time and the propagation delay.

28. The apparatus of claim 27, wherein the one or more processors are configured to transmit a request for the uncorrected absolute time.

29. The apparatus of claim 27, wherein the
message includes a reference distributed frame number (DFN), and wherein the one or more processors, to set the absolute time, are configured to set the absolute time based at least in part on the DFN.

30. The apparatus of claim 27, wherein the message includes one or more of an indication of uncertainty for the uncorrected absolute time or an indication of a time information type.

* * * * *